(12) United States Patent
Solh

(10) Patent No.: US 9,894,298 B1
(45) Date of Patent: *Feb. 13, 2018

(54) LOW LIGHT IMAGE PROCESSING

(71) Applicant: Amazon Technologies, Inc., Reno, NV (US)

(72) Inventor: Mashhour Solh, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/498,848

(22) Filed: Sep. 26, 2014

(51) Int. Cl.
| | |
|---|---|
| *H04N 5/225* | (2006.01) |
| *H04N 9/68* | (2006.01) |
| *H04N 9/09* | (2006.01) |
| *G06T 5/00* | (2006.01) |
| *H04N 5/357* | (2011.01) |
| *H04N 5/232* | (2006.01) |

(52) U.S. Cl.
CPC ......... *H04N 5/357* (2013.01); *H04N 5/23238* (2013.01); *H04N 5/23293* (2013.01)

(58) Field of Classification Search
CPC ............. G06T 2207/20221; G06T 5/50; G06T 2207/10024; G06T 2207/10041; G06T 2207/20208; G06T 3/4061; G06T 5/002; G06T 5/003; G06T 5/009; G06T 7/33; G06T 7/55; H04N 13/0037; H04N 9/045; H04N 9/09

See application file for complete search history.

(56) References Cited

U.S. PATENT DOCUMENTS

| | | | | |
|---|---|---|---|---|
| 7,433,540 | B1 * | 10/2008 | Schuster | .................. G06K 9/32 345/629 |
| 9,619,861 | B2 * | 4/2017 | Na | ............................. G06T 3/40 |
| 2010/0265316 | A1 | 10/2010 | Sall et al. | |
| 2011/0025827 | A1 | 2/2011 | Shpunt et al. | |
| 2011/0199514 | A1 * | 8/2011 | Tamura | .............. H04N 5/23229 348/234 |
| 2011/0293175 | A1 * | 12/2011 | Yoon | .................. H04N 5/23238 382/165 |
| 2012/0249536 | A1 * | 10/2012 | Sutou | ................. H04N 13/0011 345/419 |
| 2013/0016251 | A1 | 1/2013 | Ogasahara | |
| 2013/0076749 | A1 | 3/2013 | Maeda et al. | |
| 2014/0218540 | A1 | 8/2014 | Geiss et al. | |
| 2014/0320602 | A1 * | 10/2014 | Govindarao | ........... H04N 9/045 348/46 |
| 2015/0022643 | A1 | 1/2015 | Stetson et al. | |
| 2015/0078678 | A1 * | 3/2015 | Grandin | ............... H04N 5/2258 382/284 |

* cited by examiner

*Primary Examiner* — Jessica M Prince
(74) *Attorney, Agent, or Firm* — Polsinelli LLP

(57) ABSTRACT

Various embodiments provide a method of enhancing images in low lighting conditions wherein a color image is captured with a color camera, a first monochromatic image is captured with a first monochromatic camera, and a second monochromatic image is captured with a second monochromatic camera. Image registration is performed to align the first and second monochromatic images and the luminance information from the registered monochromatic images is fused with chrominance information from the color image.

20 Claims, 21 Drawing Sheets

LOW LIGHT IMAGE PROCESSING

BACKGROUND

Computing devices are often used to capture data, such as when capturing an image using a digital camera or a camera on a computing device. For computing devices, such as smartphones, capturing quality images in low lighting conditions can be a challenge. Due to the relatively small camera lenses and image sensor utilized by these devices, an amount of light sufficient for capturing quality images does not often reach the image sensor in low lighting conditions. Since the pixels of the image sensors are often quite small, the lack of sufficient lighting makes the sensor particularly prone to noise. The resulting images may often appear grainy and lack detail that would otherwise be available had the image been captured during the day, for example. Denoising technologies have been employed to mitigate such shortcomings, however, at the detriment of image detail by undesirably increasing an image's blurriness. These and other shortcomings of conventional approaches can be detrimental to the overall user experience and, as such, an improved approach to handling image capture in low lighting conditions is desirable.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enhancing images. In particular, various approaches provide a method of enhancing images in low lighting conditions wherein color information from a color image is fused with luminance information from a monochromatic image. Various other functions and advantages are described and suggested below as may be provided in accordance with the various embodiments.

Figure 1:
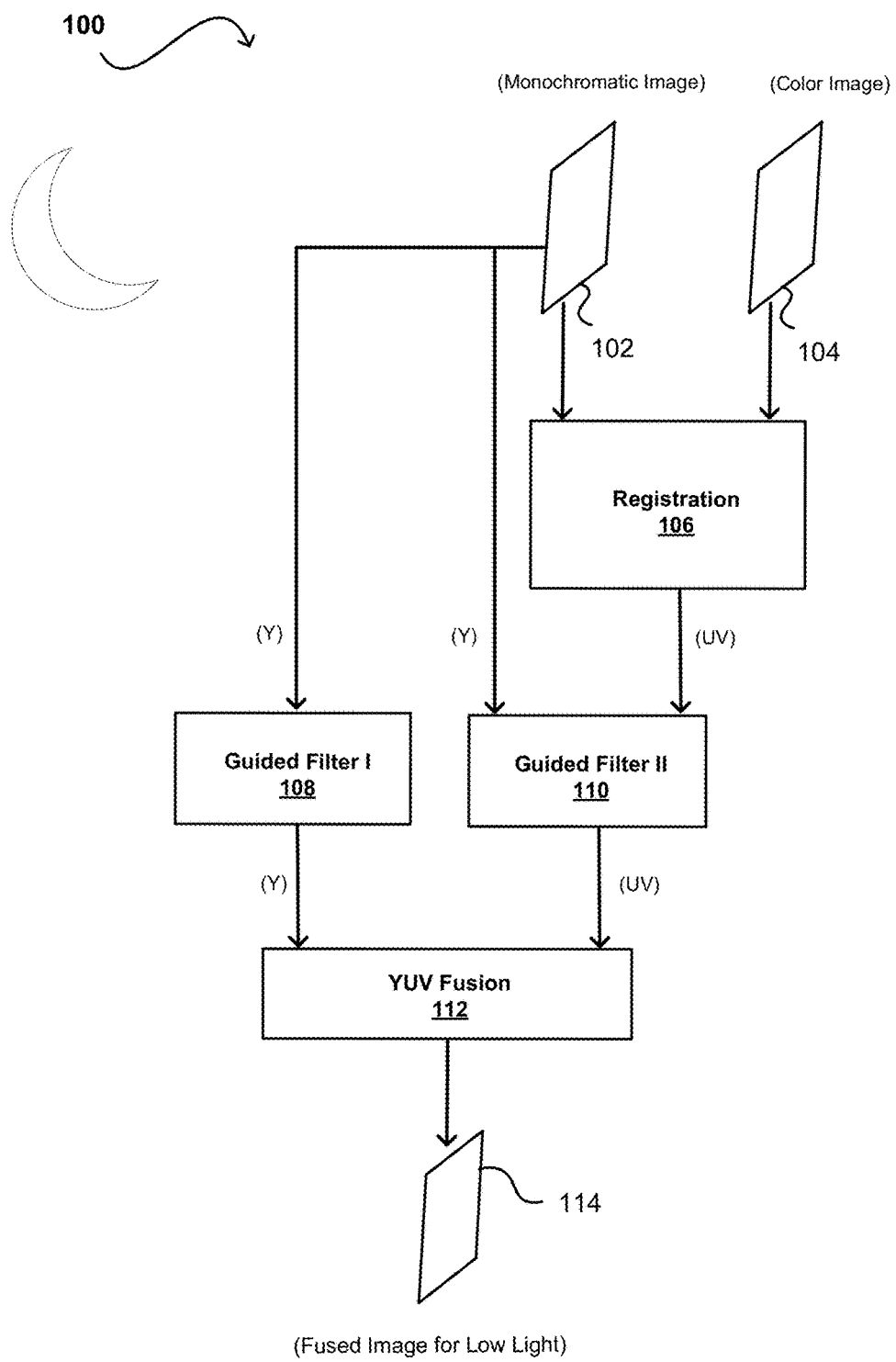
FIG. 1 illustrates an example low lighting image processing pipeline overview wherein a monochromatic image is combined with a color image in accordance with at least one embodiment.

FIG. 1 illustrates a high level overview of low lighting image process overview 100 wherein a monochromatic image is combined with a color image in accordance with at least one embodiment. Due to the relatively small lens assemblies and image sensors often utilized on computing devices, such as smartphones and tablets, the amount of light sufficient for capturing quality images in low lighting conditions is not always able reach the image sensor. This is partly the result of the relatively small pixels of the image sensors utilized by these devices. In low lighting conditions, the relatively small size of these pixels does not enable sufficient light to reach all the pixels, thus, resulting in grainy or noisy images that lack relative detail as compared to images captured by the same lens assembly and image sensor in sufficient lighting conditions. Thus, in an attempt to improve image quality of images captured in low lighting conditions, monochromatic image 102 is combined with color image 104. For example, monochromatic image 102 and color image 104 of an object are simultaneously captured and, in order to improve the low light quality of color image 104, the chrominance component (Y) from monochromatic image 102 is combined with the luminance component (UV) of color image 104.

In this example, since monochromatic image 102 and color image 104 are captured from slightly different angles, they capture a slightly different field of view and must undergo a registration process 106 to determine registration data between their corresponding viewpoints. In this example, guided filter process 110 is applied on color image 104 using monochromatic image 102 as a first guide to smooth the colors of color image 104 to generate chrominance image data where the luminance component from color image 104 has been removed. Accordingly, the guided filter additionally has good edge-preserving properties and can be used beyond smoothing. Thus, with the help of the guidance image, the guided filter can make an output image more structured or impart more structure to the output image from the guidance image. Thus, in this example, guided filter process 108 is applied to monochromatic image 102 using monochromatic image 102 as a second guide to generate luminance image data. Accordingly, the chrominance image data and the luminance image data are then combined in YUV fusion 112 to generate fused image 114. Each of these steps, and others, will be explained in greater detail with respect to the following figures.

Figure 2A:
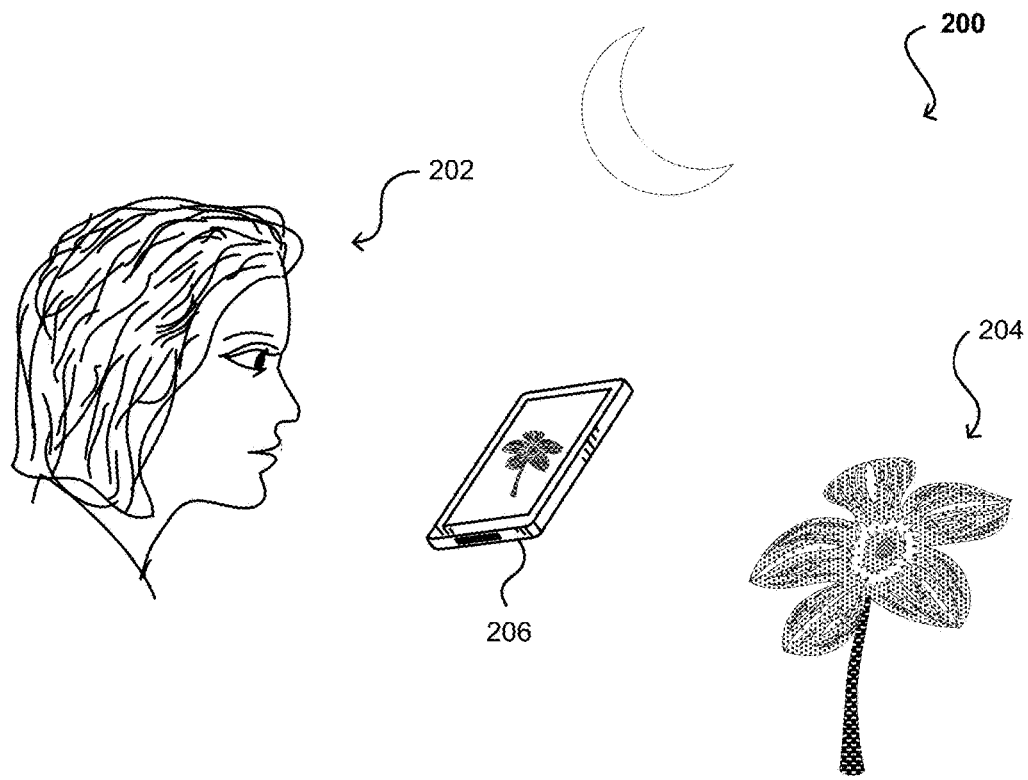
FIG. 2A illustrates an example situation wherein user is capturing an image of an object in accordance with at least one embodiment.

FIG. 2A illustrates an example situation 200 in which user 202 is capturing an image of flower 204 at night with two or more cameras of computing device 206 in accordance with at least one embodiment. Although a smart phone and a tablet computer are shown, it should be understood that various other types of electronic or computing devices that are capable of determining and processing input can be used in accordance with various embodiments discussed herein. These devices can include, for example, digital cameras, notebook computers, desktop computers, personal data assistants, smart-watches, tablet computers, phablets, electronic book readers, video gaming consoles or controllers, televisions or smart televisions, and portable media players, among others.

Figure 2B:
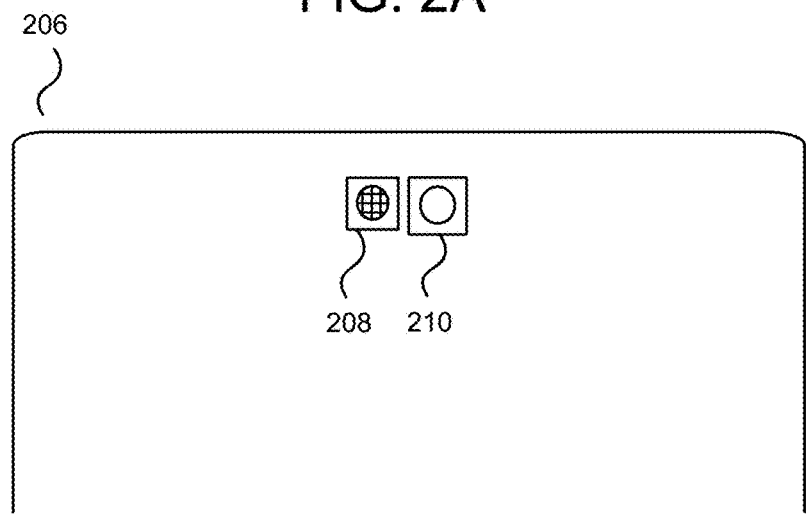
FIG. 2B illustrates an example computing device having a monochromatic camera and a color camera in accordance with at least one embodiment.

FIG. 2B shows monochromatic or mono camera 208 and color or Red, Green, and Blue ("RGB") camera 210 of computing device 206 in accordance with at least one embodiment. User 202 can use mono camera 208 and RGB camera 210 of the device 206 to capture image data (i.e., photographs, pictures, video, etc.). For example, as shown in FIG. 2A, user 202 is capturing an image of flower 204. Due to the relatively small lens assemblies and image sensors often utilized on devices, such as device 206, the amount of light sufficient for capturing quality images in low lighting conditions does not always reach the image sensor. Since the pixels of these image sensors are often small, sufficient light doesn't reach all the pixels and the resulting images captured in low lighting conditions are often grainy or noisy and lack relative detail as compared to images captured by the same lens assemblies and image sensors in sufficiently lit lighting conditions.

Figure 3:
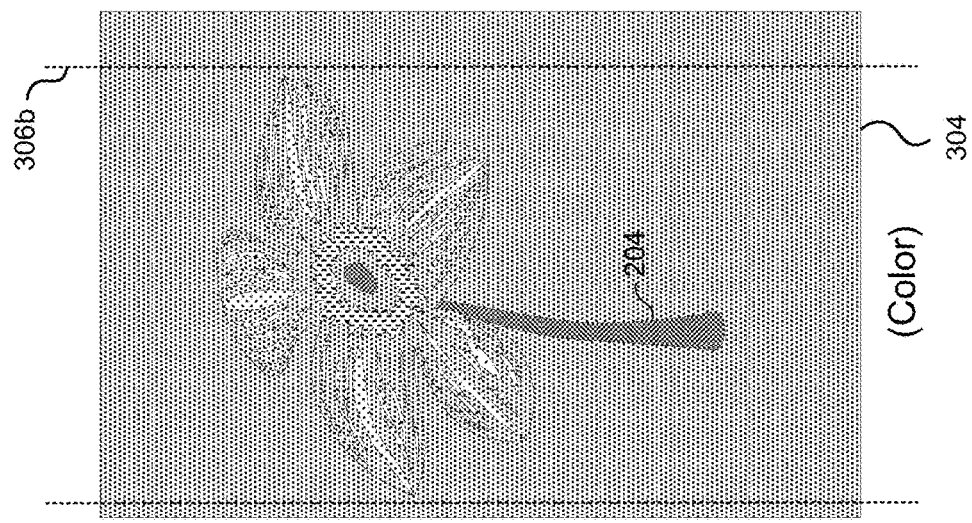
FIG. 3 illustrates example images of an object captured using a monochromatic camera and a color camera in accordance with at least one embodiment.
Figure 3:
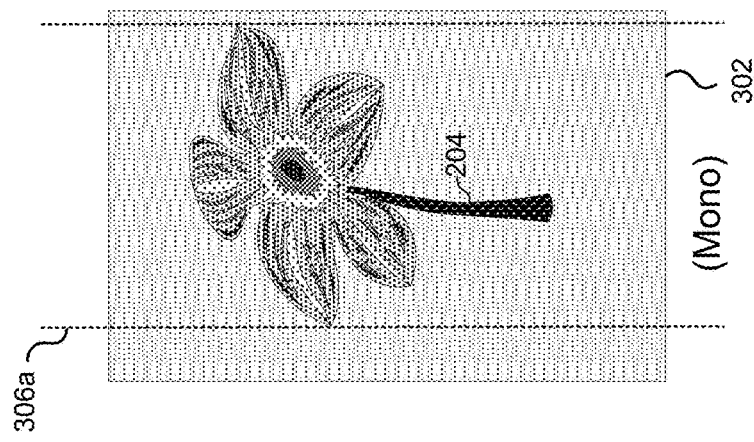

In an attempt to improve image quality of images captured in low lighting conditions, a grayscale image captured using mono camera 208 is fused with a color image captured using RGB camera 210 in accordance with various embodiments discussed herein. Accordingly, FIG. 3 shows mono image 302 captured using mono camera 208 and color image 304 captured using RGB camera 210 in accordance with at least one embodiment. In this example, mono camera 208 captures grayscale images at a resolution of 3 megapixels and color image 304 captures color images at a resolution of 15 megapixels. It should be appreciated, however, that these resolutions are provided for discussion purposes and can vary. In this example, mono image 302 and color image 304 are shown with a similar lines-per-millimeter value, resulting in a surface area (size) difference between mono image 302 and color image 304. Additionally, since mono camera 208 and RGB camera 210 capture images of flower 204 from different angles, due to their horizontal separation on the back face of device 206, there is a difference in the location of flower 204 or disparity (306a, 306b) between these images.

Figure 4:
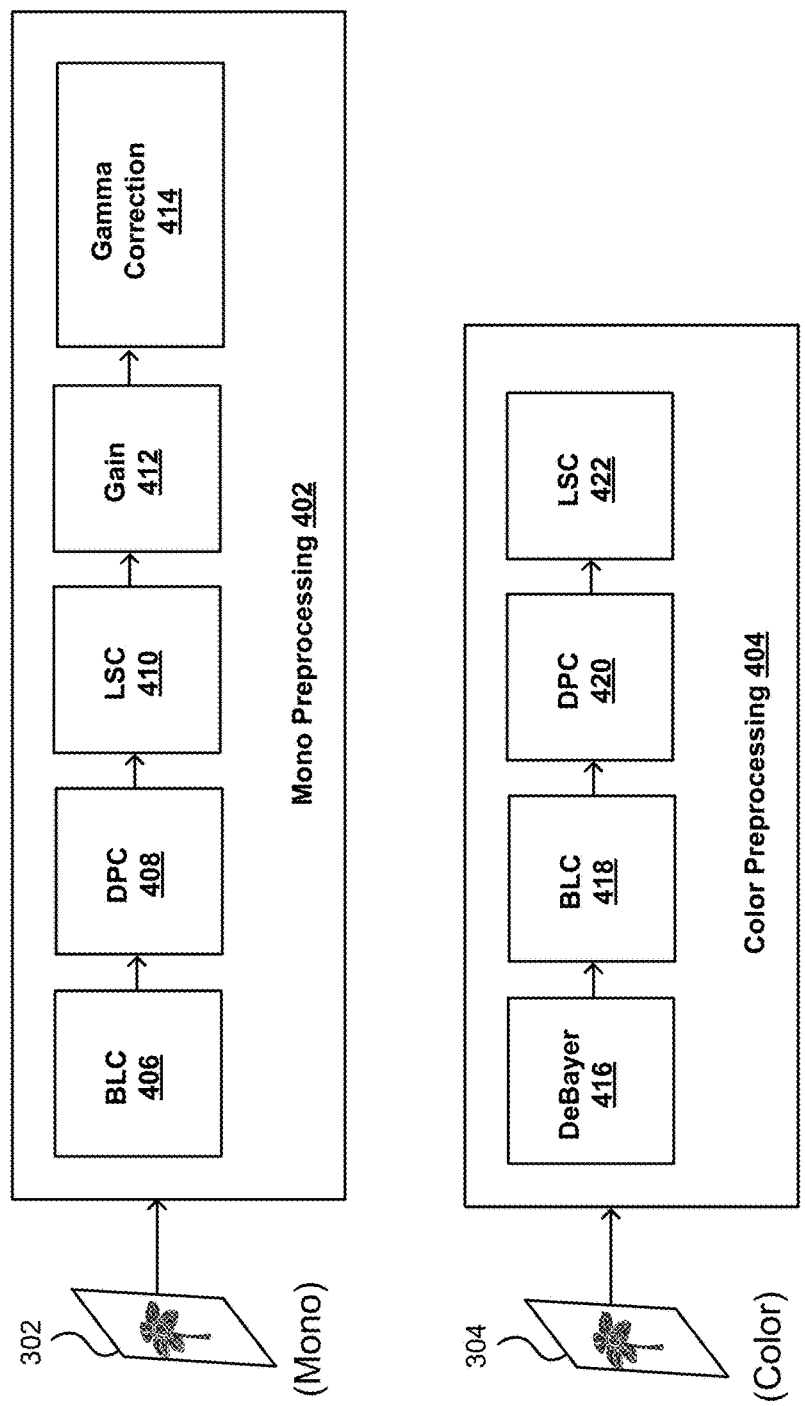
FIG. 4 illustrates an example preprocessing operation of an image processing pipeline for a monochromatic image and a color image in accordance with at least one embodiment.

A low light image signal processing pipeline that fuses mono image 302 and color image 304 begins with multiple preprocessing operations. Accordingly, FIG. 4 illustrates example preprocessing operations in accordance with at least one embodiment. In a first step of the low light image signal processing pipeline, mono image 302 undergoes mono preprocessing 402 and color image 304 undergoes color preprocessing 404. Mono preprocessing 402 includes calibrating the black level of mono image 302 in mono Black Level Correction ("BLC") 406, replacing defective pixels by adjusting adjacent pixels values in defective pixel correction 408, lens shading correction ("LCS") 410, removing artifacts caused by variations in the pixel-to-pixel sensitivity of the sensor in gain 412, and translating the camera's light sensitivity to that for the human eye in gamma correction 414. Similarly, RGB preprocessing 404 includes reconstructing a full color image from the incomplete color sample output from the image sensor in Debayer 416, calibrating the black level of color image 304 in color black level correction ("BLC") 418, replacing defective pixels by adjusting adjacent pixels values in defective pixel correction 420, and lens shading correction ("LCS") 422. Various other image preprocessing techniques may also be applied based on various factors and for different lens and sensor assemblies.

Figure 5:
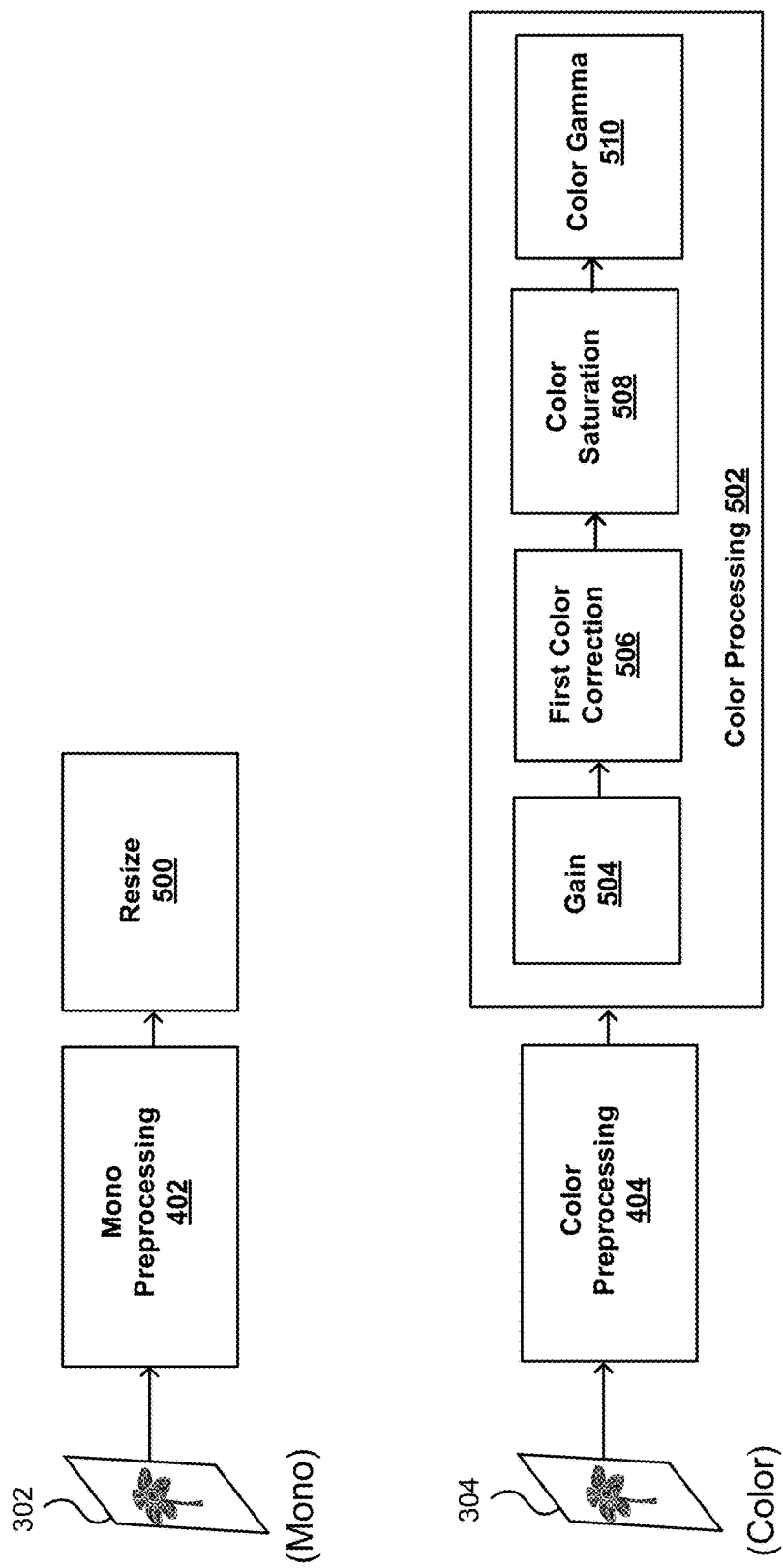
FIG. 5 illustrates an example resizing operation of an image processing pipeline for a monochromatic image and an example color processing operation for a color image in accordance with at least one embodiment.

After mono preprocessing 402, mono image 302 is resized to match the size of color image 304 and the colors of color image 304 are boosted after RGB preprocessing 404 in order to fuse with mono image 302. These operations are described with respect to FIG. 5. Accordingly, FIG. 5 illustrates Resize 500 operation for mono image 302 and color processing 502 for color image 304 of the low light image processing pipeline in accordance with at least one embodiment. Starting with Color Processing 502 operation, the gain is substantially boosted in Gain 504 operation. For example, the gain value is typically only boosted 4 times its initial value read off the image sensor in conventional methods and, in this instance, the gain is boosted around 60 times its initial value. In conventional methods, increasing the gain means increasing the noise. Since, however, the Y component (in the YUV color space) of mono image 302 is used to reduce the noise, the resulting noise caused by the boosted gain, in this instance, is inconsequential.

After the gain is boosted in Gain 504 operation, the colors of color image 304 are corrected at First Color Correction 506. As a result of combining mono image 302 with color image 304, the color correction is not a linear process that can be applied to each image. Thus, a procedure for handling each case has been empirically determined. Since mono camera 208 is more sensitive to light relative to RGB camera 210, the color values are boosted and the color themselves enhanced to compensate for the difference in pixel values in color saturation 508 and color gamma 510 after First Color Correction 506. Color saturation 508 can be performed to adjust the intensity of color in the image as needed, such as to avoid oversaturation or underexposure effects. Color gamma 510 is a similar process as described above with respect to gamma correction 414 from mono preprocessing 402, however, the gamma correction is applied separately to each RGB channel to individually calibrate each channel in this instance.

Figure 6A:
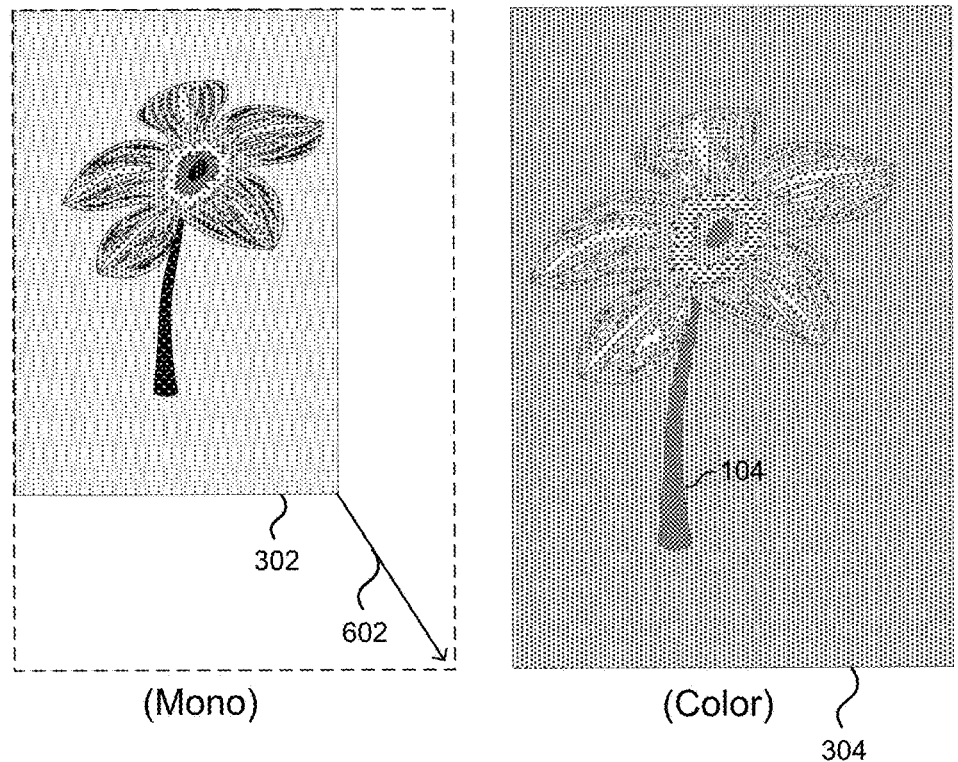
FIGS. 6A and 6B illustrate an example resizing operations in accordance with at least one embodiment.

Additionally, shown in FIG. 5, is Resize 500 operation for mono image 302. In this operation, the size of mono image 302 is enlarged to match the size of color image 304. FIG. 6A illustrates show example relative sizes of mono image 302 and color image 304 as they would appear with the same lines per millimeter measure. For example, the relatively low resolution of mono image 302 will often not contain a sufficient number of pixels to properly match the size color image 304. Thus, in order to fuse mono image 302 and color image 304, mono image 302 must be enlarged 602 to be the same size as color image 304 by adding pixels. Since mono camera 208 captures images at a smaller resolution relative to RGB camera 210, mono image 302 will be enlarged 602 to match the size of color image 304 when the desired size of an image to be captured is relatively large to preserve the detail captured at the higher resolution by RGB camera 210. Accordingly, in order to increase the number of pixels, pixels are added to mono image 302 through interpolation, which is known as upsampling. Thus, in Resize 500 operation, mono image 302 is examined and additional pixels are added to match the size or resolution of color image 304.

Figure 6B:
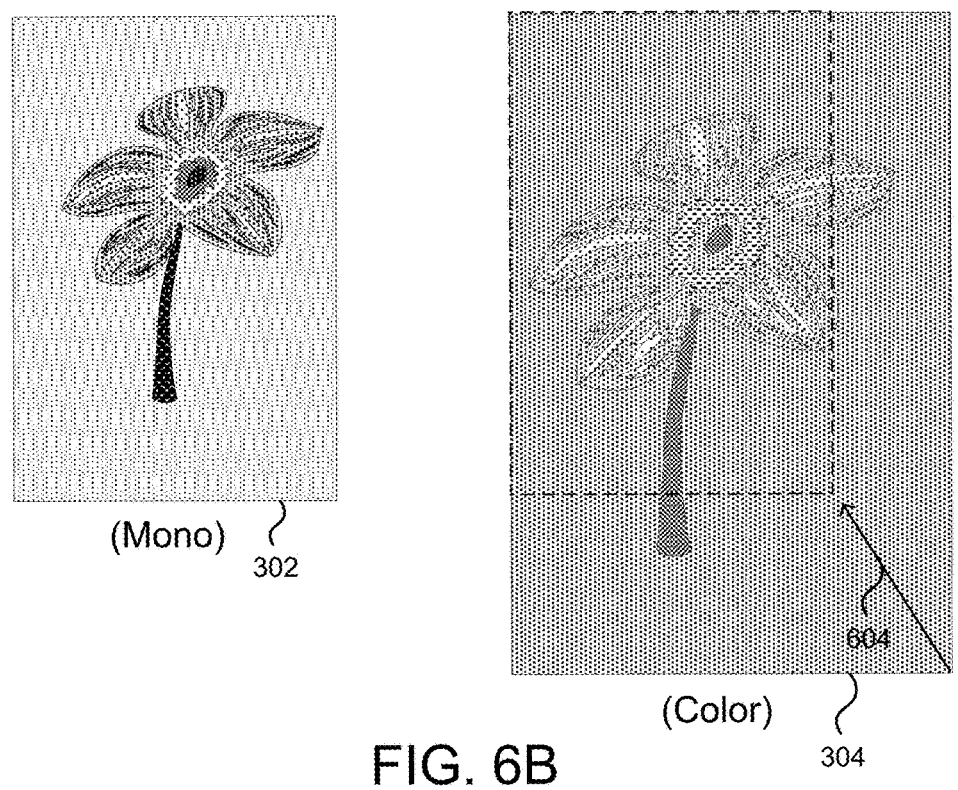

If, however, the desired size of the image is to be captured at a size less than or equal the resolution of mono image 302, then color image 304 could be resized down to match the size of mono image 302. This instance is shown in FIG. 6B, which shows color image 304 being shrunk 604 to match the size of smaller mono image 302. Thus, a function wherein computing device 206 either enlarges 602 mono image 302 or shrinks 604 color image 304 depending on various factors, conditions, etc., such as output image size, available lighting conditions, or the like.

Figure 7:
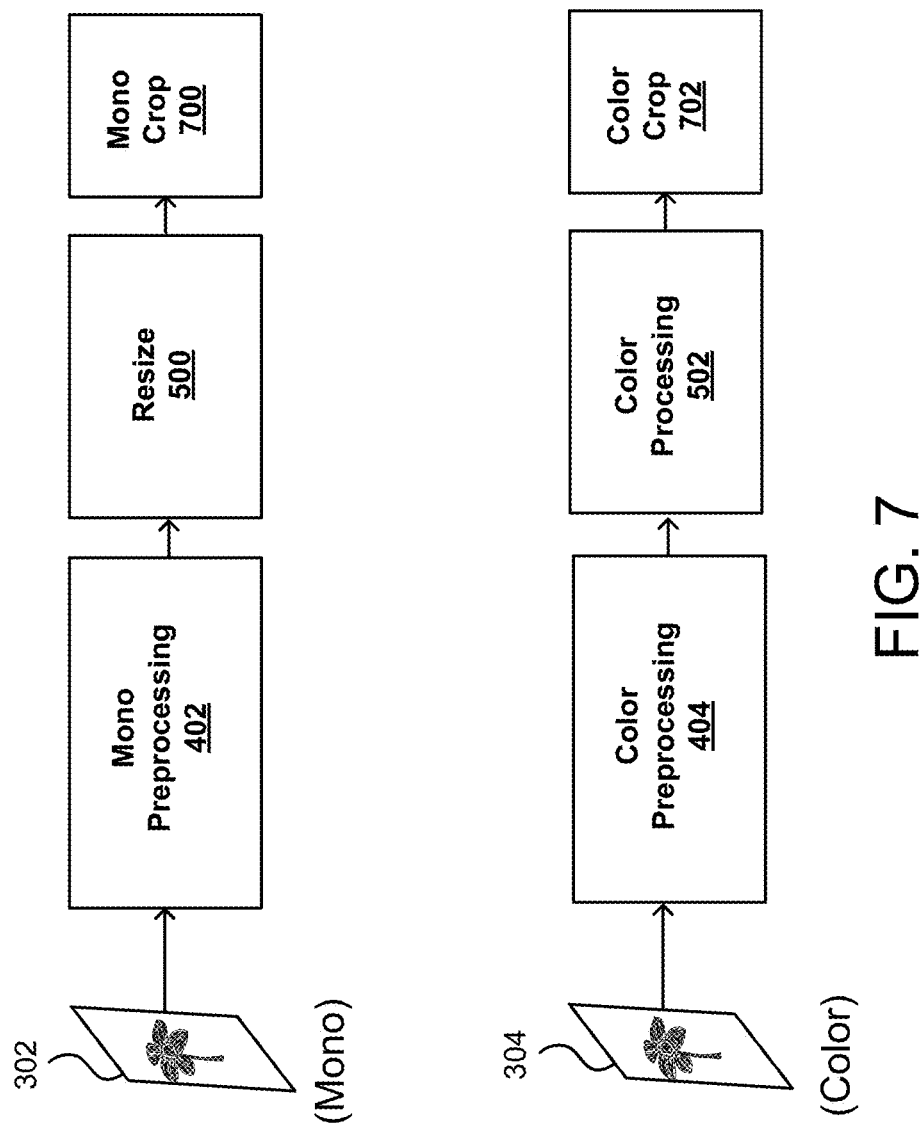
FIG. 7 illustrates an example cropping operation of an image processing pipeline for a monochromatic image and a color image to match corresponding fields of view in accordance with at least one embodiment.
Figure 8A:
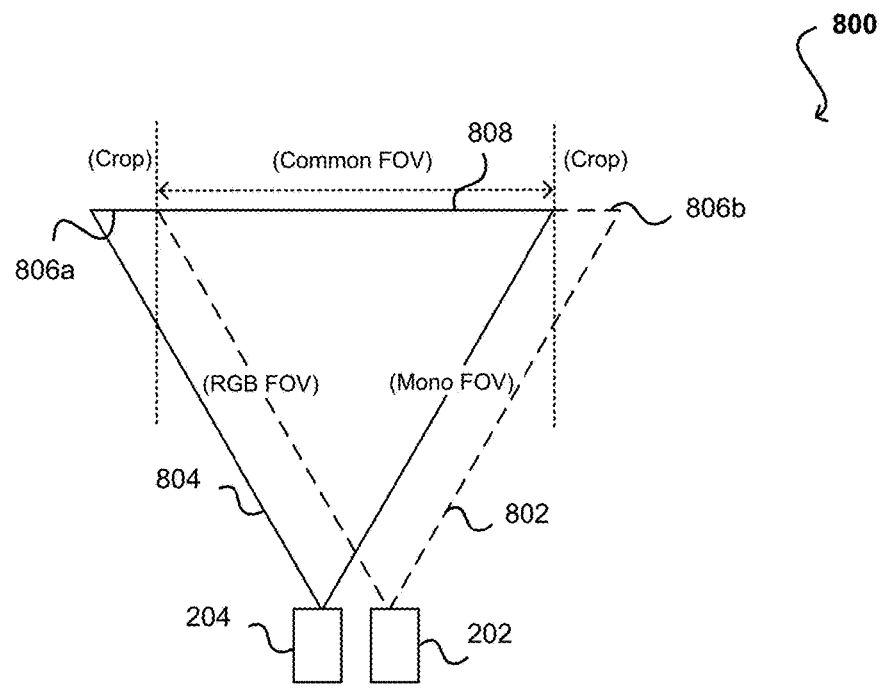
FIG. 8A illustrates overlapping fields of view for the monochromatic camera and the color camera in accordance with at least one embodiment.
Figure 8B:
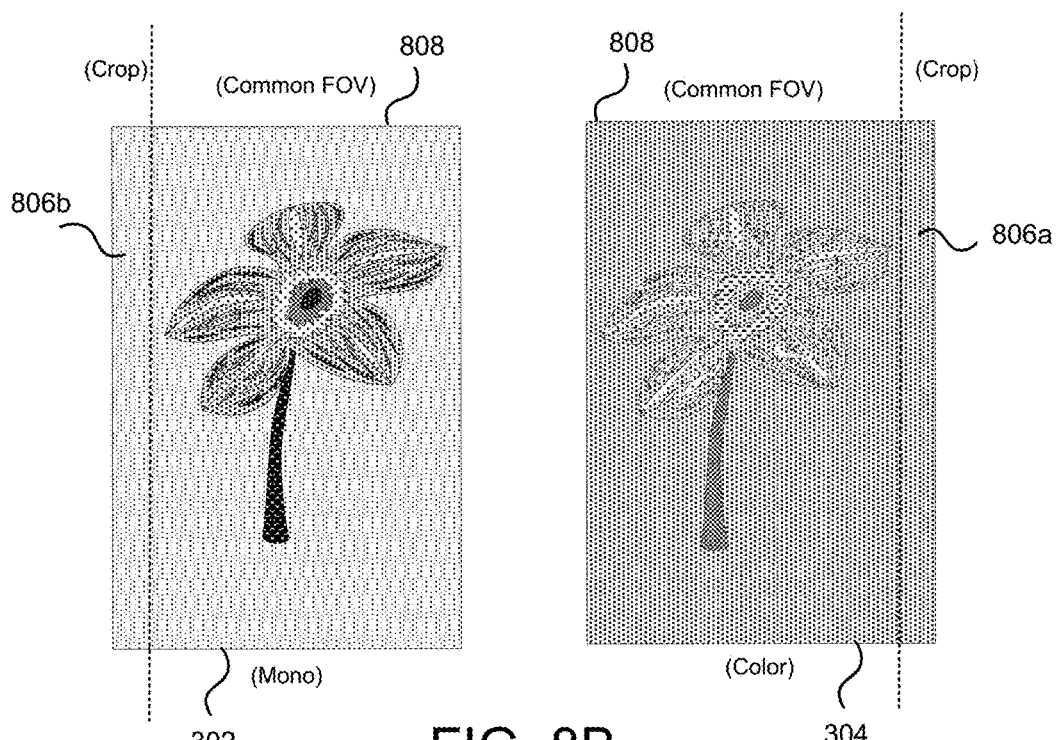
FIG. 8B illustrates portions of the monochromatic image and the color image to be cropped to match the corresponding fields of view in accordance with at least one embodiment.

FIG. 7 illustrates the addition of cropping operations (700, 702) into the image processing pipeline in accordance with at least one embodiment. In this example, as a result a horizontal separation between mono camera 208 and RGB camera 210 on the back face of device 206, they each capture images of flower 204 from a different angle, they each capture a slightly different field of view (FOV). Thus, in this example, mono image 302 is cropped in Crop 1 700 operation and color image 304 is cropped in Crop 2 702 operation to match their overlapping FOVs. For example, FIG. 8A illustrates overlapping FOVs for mono camera 208 and RGB camera 210 in accordance with at least one embodiment. In this example, mono camera 208 captures images from mono FOV 802 and RGB camera 210 captures images from RGB FOV 804, which overlap in common FOV 808, but are not perfectly aligned, as described above. In this example, mono FOV portion 806a of mono FOV 802 and RGB FOV portion 806b of RGB FOV 802 do not overlap and are, thus, cropped out or removed. This is also shown in FIG. 8B, which additionally illustrates the difference in the location of flower 204 or disparity (306a, 306b from FIG. 3) between mono image 302 and color image 304, thereby necessitating FOV consensus.

Figure 9:
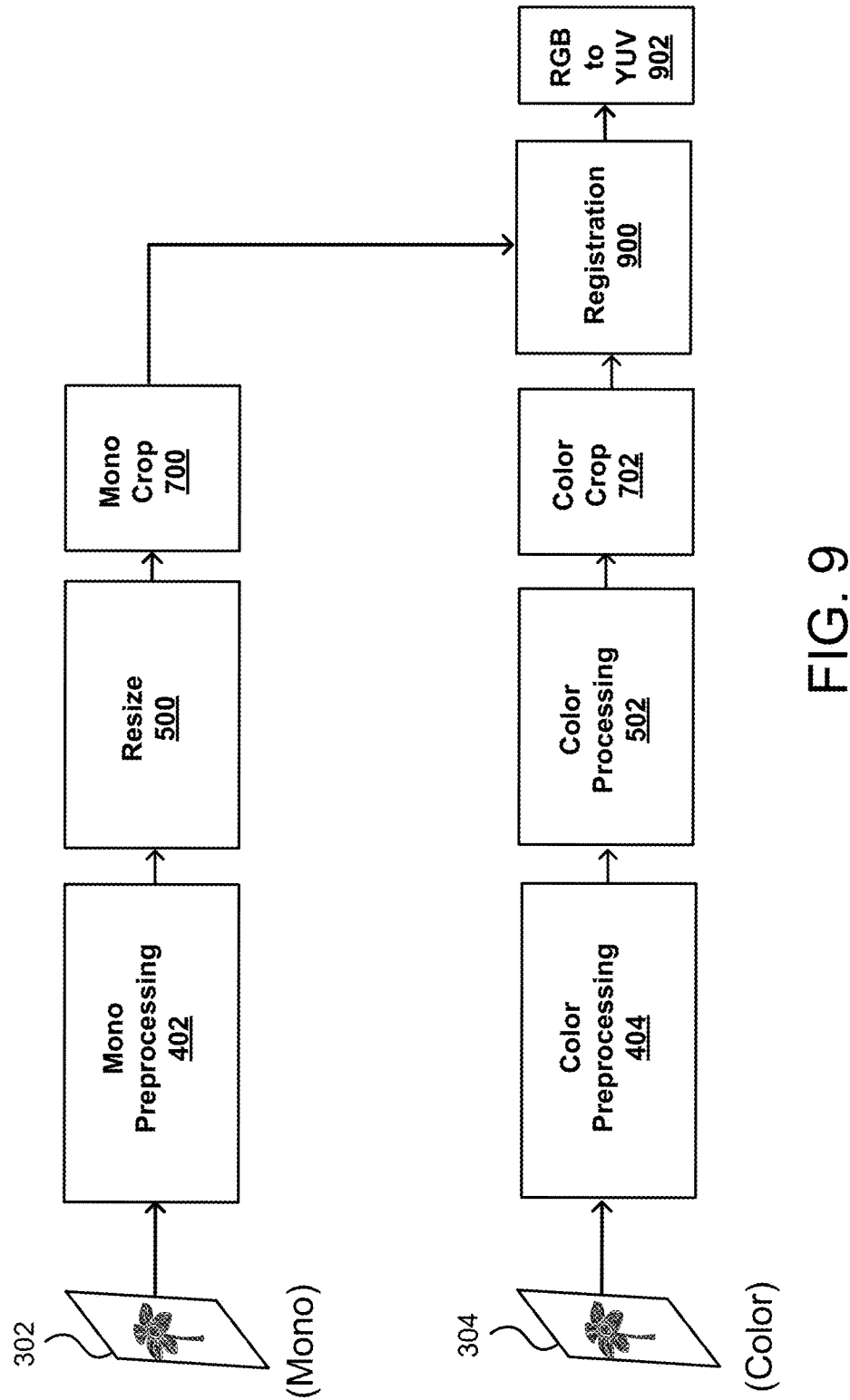
FIG. 9 illustrates an example registration operation of an image processing pipeline to register the monochromatic image to the color image in accordance with at least one embodiment.

FIG. 9 illustrates the addition of Registration 900 operation and RGB to YUV Conversion 902 operation into image processing pipeline in accordance with at least one embodiment. As mentioned above, mono camera 208 and RGB camera 210 capture images from different angles and, in Registration 900 operation, color image 304 is spatially aligned with mono image 302, after it has been cropped, using an image registration or image alignment algorithm and, thereby, removing disparity information. In order to maximize image quality, a more involved procedure that individually processes a foreground and background of color image 304 is discussed with respect to FIGS. 17-20. In this example, however, known techniques for determining image registration data between mono camera 208 and RGB camera 210 can be used.

Accordingly, in this example, after the image registration data between mono camera 208 and RGB camera 210 is determined, the registration data (i.e., image data for color image 304 registered to mono image 302) is converted from RGB color space to YUV color space in RGB to YUV Conversion 902 operation. RGB (red, green, and blue) is a color model defined as an additive color model because red, green, and blue light are added together to reproduce other colors. YUV is the color model typically used as part of a color image pipeline that encodes a color image while taking human perception into account, thus, allowing for reduced chrominance component bandwidth. YUV is often preferred to RBG because it enables transmission errors or compression artifacts to be more efficiently masked by the human perception than they would be using the RGB model. The YUV defines a color space in terms of a luma (Y) and two chrominance (UV) components. Black-and-white systems have used only luma (Y') information and color information (U and V) was added later so that a black-and-white receiver would still be able to receive and display a color picture transmission in the receiver's native black-and-white format. In order to add color to a black-and-white system, the U and V signals were added as "color difference" signals. The U or blue-luminance signal is the difference between the Blue (B) signal and the Y signal (i.e., B-Y) and the V or red-luminance signal is the difference between the Red (R) signal and the Y signal (i.e., R-Y).

In order to reduce noise and increase the quality of images captured in low lighting conditions, the luma (or brightness) information Y from mono image 302 is fused with U and V (chrominance) information from color image 304. Thus, in RGB to YUV Conversion 902 operation, the colors captured in RGB space are converted to the YUV space to split up these components. It should be appreciated, however, that various embodiments discussed herein could be performed without performing an RGB to YUV conversion, as discussed with respect to RGB to YUV Conversion 902 operation and continue to be performed in the RGB color space.

Figure 10:
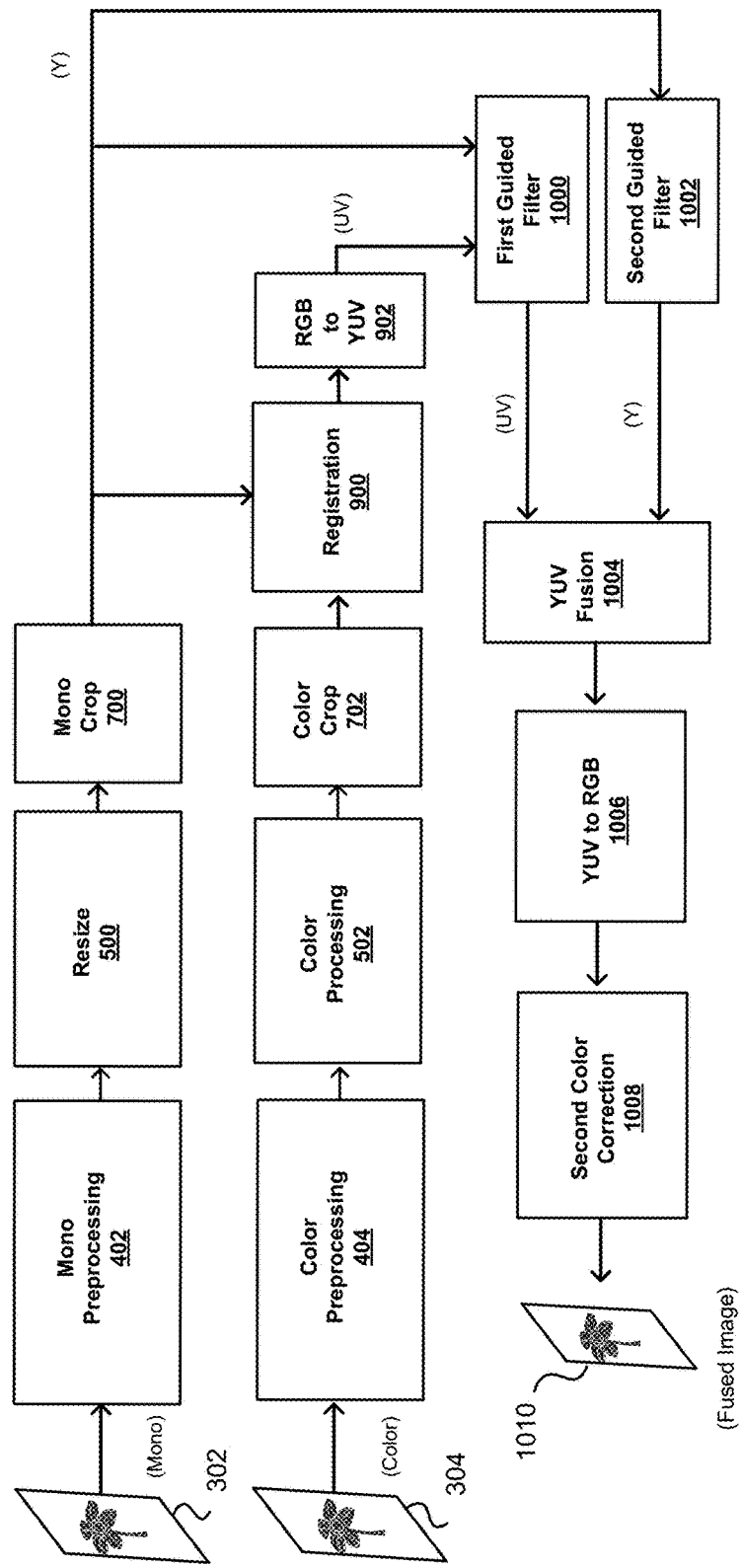
FIG. 10 illustrates an example low lighting image processing pipeline overview wherein a single monochromatic image is combined with a color image in accordance with at least one embodiment.

FIG. 10 illustrates an example low lighting image processing pipeline overview in accordance with at least one embodiment. In this example, after Registration 900 operation, First Guided Filter 1000 operation applies a guided filter on registered color image 304 using mono image 302 as a guide and Second Guided Filter 1002 operation applies a guided filter on mono image 302 where mono image 302 is used as the guiding image on itself. At some point, either before or after Registration 900, the Y component is removed from color image 304, thus, only the U and V component data is used as an input to First Guided Filter 1000 and, since mono image 302 is the guiding image, the output also only contains data for the U and V components. Thus, the products of First Guided Filter 1000 operation and Second Guided Filter 1002 operation are the U and V components originally from color image 304 and the Y component originally from mono image 302, respectively, and these components are combined in YUV Fusion 1004 operation to fuse the color or chrominance of the U and V components with the luminance or brightness of the Y component.

Accordingly, once the U, V, and Y components are combined to form YUV image data, the image data can be converted from YUV color space to RGB color space in YUV to RGB 1006 operation. A second color correction operation, Second Color Correction 1008 operation, is performed to generate fused image 1010.

Figure 11:
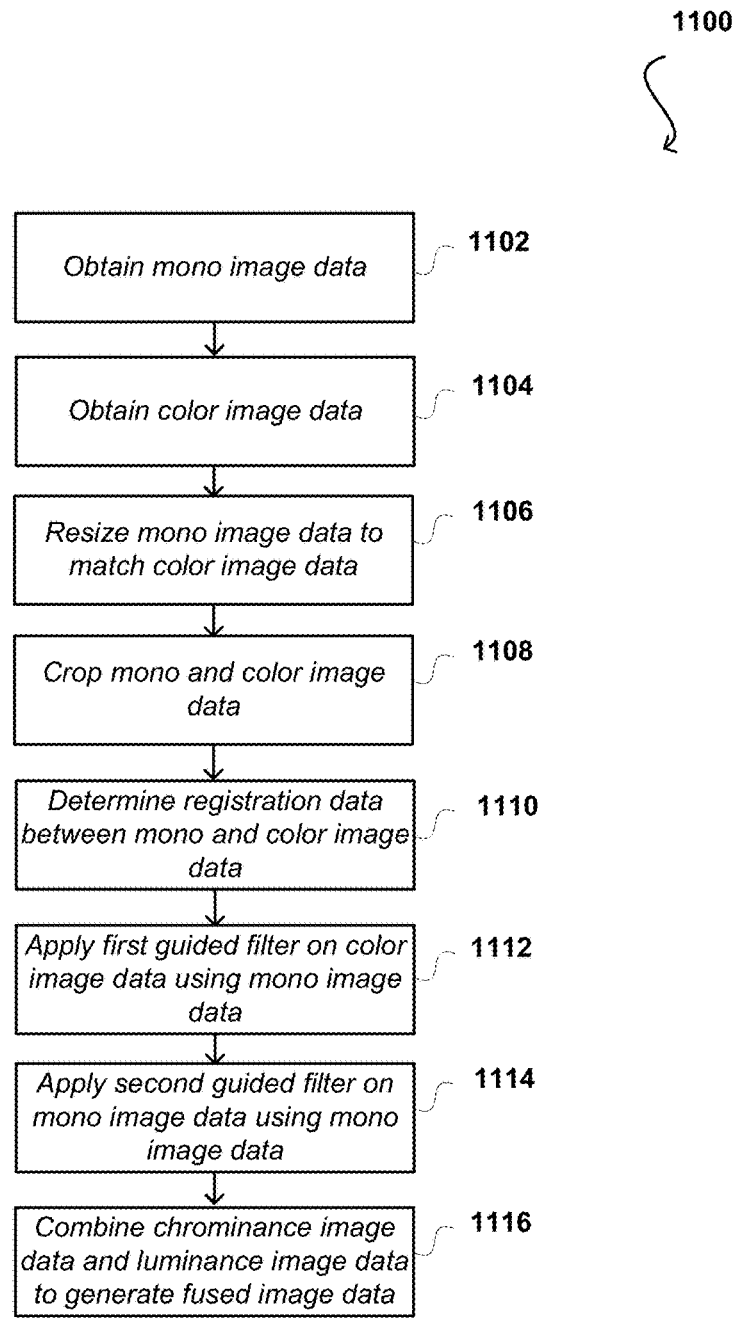
FIG. 11 illustrates an example process for combining a single monochromatic image with a color image in accordance with at least one embodiment.

FIG. 11 illustrates an example process 1100 for combining a single monochromatic image with a color image in accordance with at least one embodiment. Accordingly, in this example monochromatic image data is captured using a first monochromatic camera of the computing device 1102. Additionally, color image data is captured using a color camera of the computing device 1104. In one example, a low light image processing pipeline is triggered by averaging image data to determine a level of illumination. Alternatively, another illumination determination method could be used, such as using light sensor. In this example, the monochromatic image data is resized from a first image resolution to match a second image resolution of the color image data 1106. Further, since the monochromatic image data and the color image data are captured from slightly different angles, they capture a slightly different field of view. Thus, in this example at least one of the color image data or the monochromatic image data is cropped to a common field of view 1108.

Once cropped to the common field of view, registration data between the color image data or the monochromatic image data is determined 1110. Accordingly, a first guided filter is applied on to the color image data using the monochromatic image data as a first guide, smoothing the colors of the color image data, to generate chrominance image data. The guided filter additionally has good edge-preserving properties and can be used beyond smoothing. Thus, with the help of the guidance image, the guided filter can make the output more structured or impart more structure to the output from the guidance image. Accordingly, a second guided filter is applied to the monochromatic image data using the monochromatic image data as a second guide to generate luminance image data 1114. The chrominance image data and the luminance image data are then combined 1116 to generate fused image data.

Figures 12, 13:
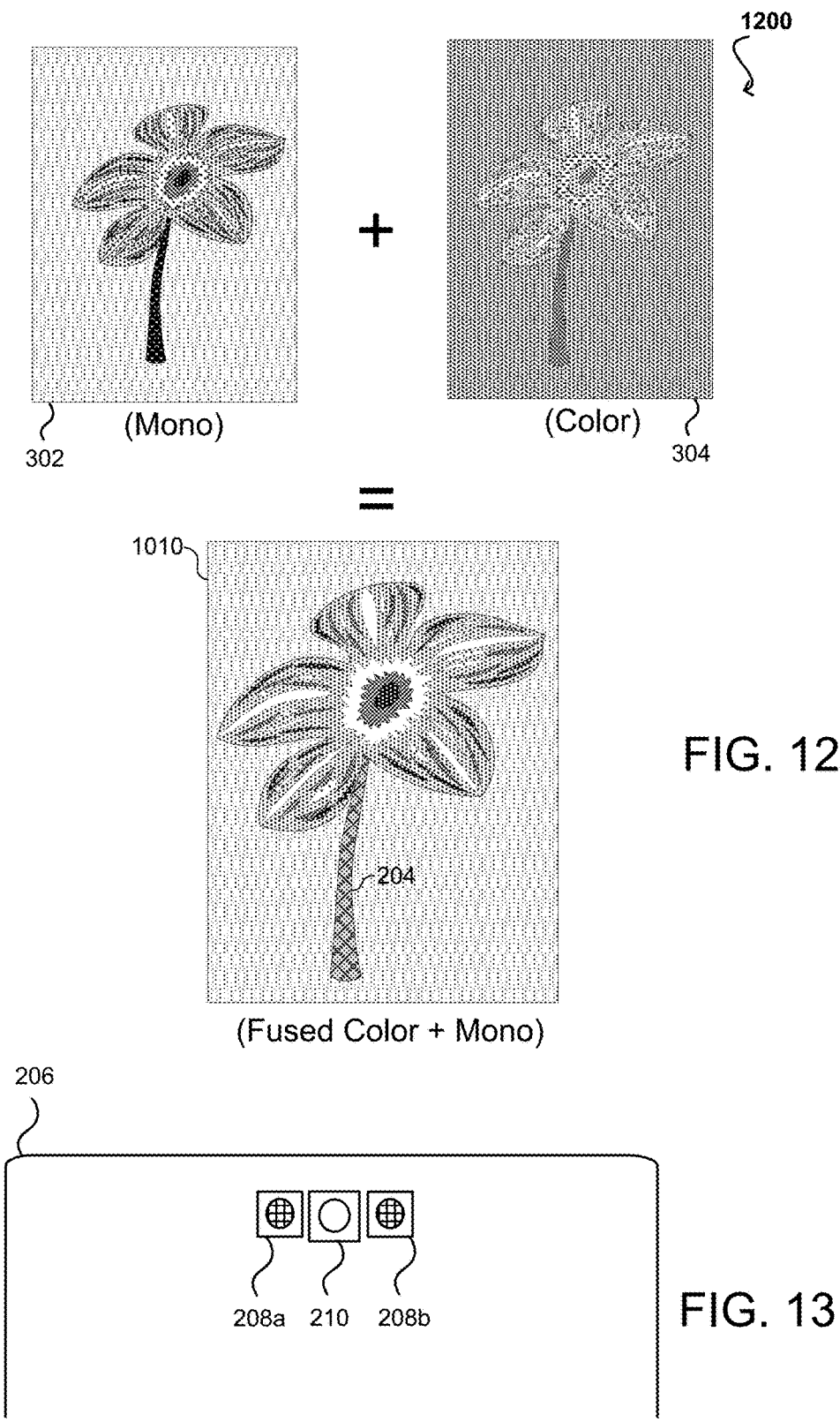
FIG. 12 illustrates an example process wherein a single monochromatic image is combined with a color image to produce a fused image in accordance with at least one embodiment.
FIG. 13 illustrates an example computing device having two monochromatic cameras and a color camera in accordance with at least one embodiment.

Accordingly, FIG. 12 illustrates an high-level example 1200 showing mono image 302 being combined with color image 304 to produce fused image 1410 in accordance with at least one embodiment. Thus, since mono camera 208 has larger pixels making it more sensitive to light and less prone to noise in low light conditions relative to color camera 210, fused image 1010 uses the brightness (Y) from a black and white or mono image 302 to preserve the detail of edges and the color (U and V) from color image 304. Fused image 1010, thus, is a color image that contains more detail and less noise relative to images captured in low lighting conditions by camera 210 alone which is a high resolution camera capable of capturing high quality images in sufficient lighting conditions.

Figure 14:
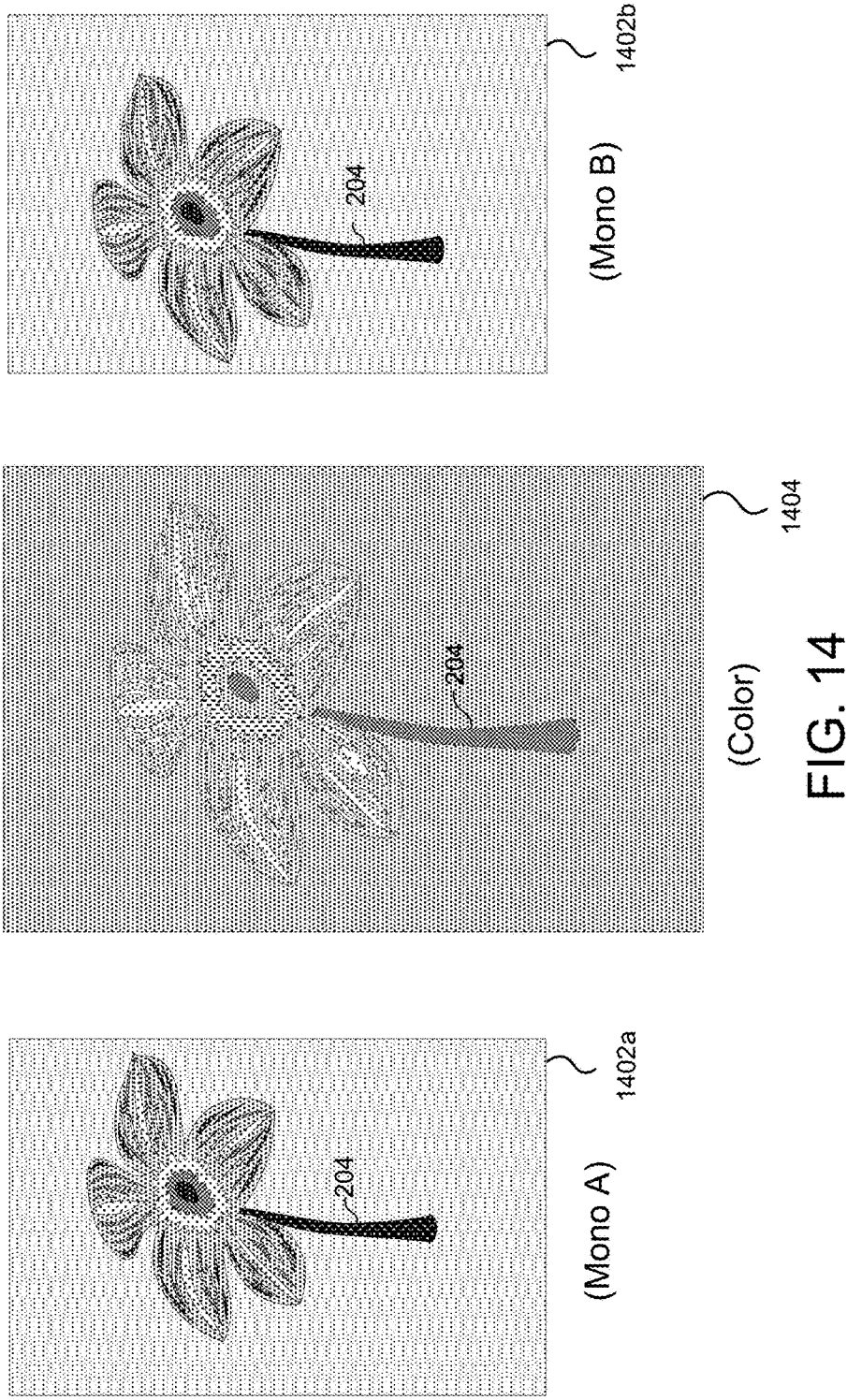
FIG. 14 illustrates example images of an object captured using two monochromatic cameras and a color camera in accordance with at least one embodiment.

FIG. 13 illustrates an example wherein computing device 206 has two monochromatic cameras, instead of one as described above, and a color camera in accordance with at least one embodiment. In this example, computing device 206 has first mono camera 208a, second mono camera 208b, and color camera 210. Accordingly, FIG. 14 shows mono image A 1402a captured using first mono camera 208a, mono image B 1402b captured using second mono camera 208b, and color image 1404 captured using color camera 210 in accordance with at least one embodiment. As discussed above, first and second mono cameras (208a, 208b) capture grayscale images, in this example, at a resolution of 3 megapixels and color camera 210 captures color images at a resolution of 15 megapixels. Further, as discussed above, mono image A 1402a, mono image B 1402b, and color image 1804 are shown with a similar lines-per-millimeter value, resulting in a surface area (size) difference between mono images (1402a, 1402b) and color image 1404. Further, due to the horizontal separation of first mono camera 208a, second mono camera 208b, and color camera 210 on the back face of device 206, there is a difference in the location of flower 204 or disparity between each images (1402a, 1402b, 1404).

Figure 15:
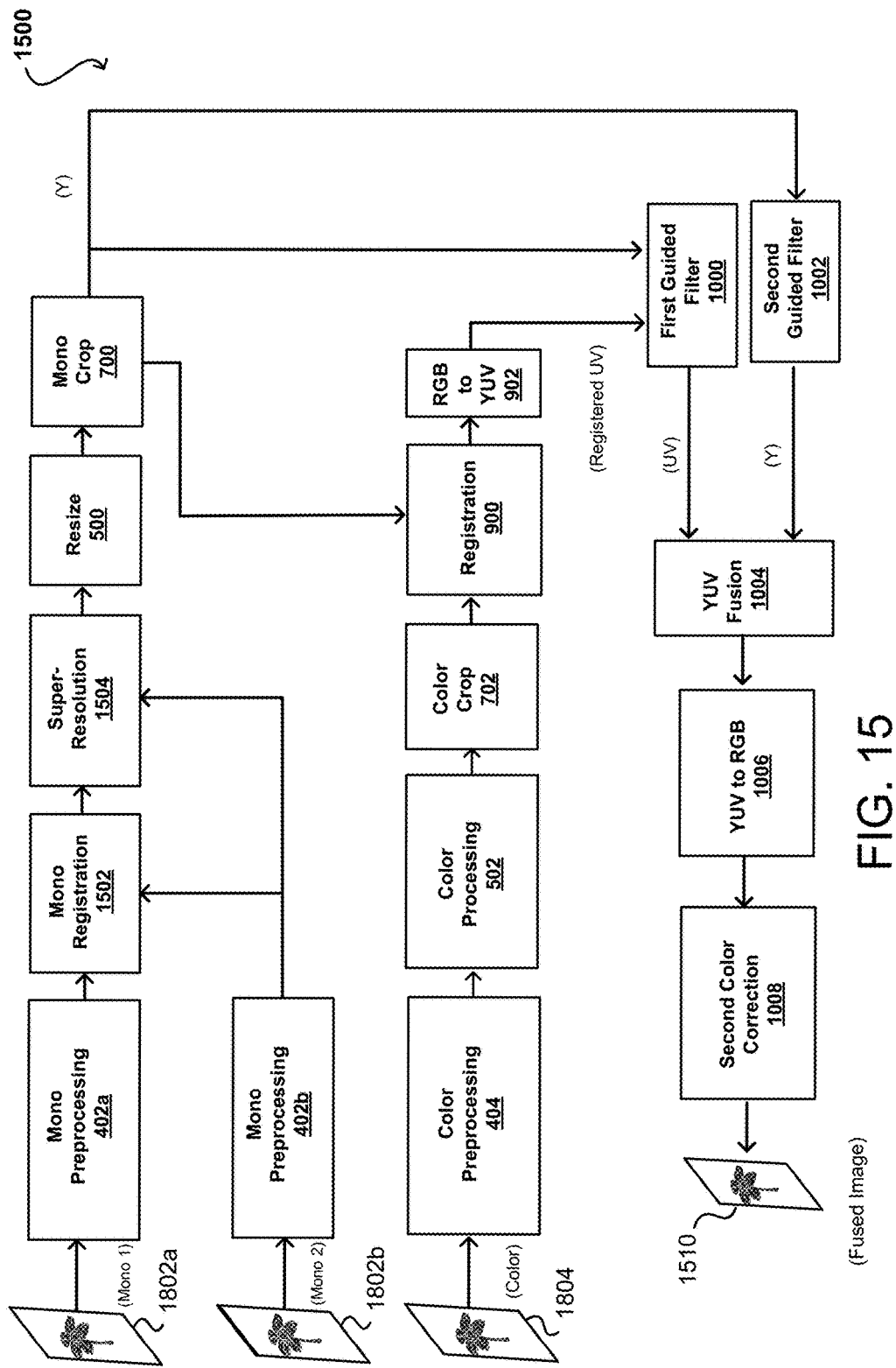
FIG. 15 illustrates an example low lighting image processing pipeline overview wherein a two monochromatic images are combined with a single color image in accordance with at least one embodiment.

Thus, a low light image signal processing pipeline fuses both mono images (1402a, 1402b) with color image 1404 is described with respect to FIG. 15. Accordingly, FIG. 15 illustrates an example low lighting image processing pipeline overview 1500 in accordance with at least one embodiment. In this example, since the color image pipeline remains substantially the same, as described above, the focus of the following description will be on the monochromatic image pipelines. Thus, first, mono image A 1402a and mono image B 1802b are each independently processed in mono preprocessing 402a and mono preprocessing 402b, respectively, which are described above with respect to mono preprocessing 402. Additionally, color image 304 undergoes color preprocessing 404. In this example, after preprocessing, mono image A 1402a and mono image B 1402b are registered in Mono Registration 1502 operation. Since mono image A 1402a and mono image B 1402b are each captured from different angle, resulting from the horizontal separation between first mono camera 208a and second mono camera 208b on the back face of computing device 206, mono registration data between these different sets of data from each image is determined to generate a single coordinate system using an image registration or image alignment algorithm. The registration between mono image A 1402a and mono image B 1402b, thus, produces mono registration data corresponding to a combined mono image and the corresponding resolution of the combined mono image is enhanced in Super-Resolution 1504 operation. In this operation, the image noise of mono image A 1402a and mono image B 1402b is reduced by averaging the two exposures and, thus, enhancing the resulting image by averaging out noise and other artifacts while potentially enriching and sharpening edges.

Additionally, the size of the single mono image is enlarged in Resize 500 operation to match the size of color image 1404 and then cropped in Crop 1 700 operation to match the FOV of color image 1404. In this example, again as a result a horizontal separation between first mono camera 208a, second mono camera 208b, and color camera 210 on the back face of device 206, they each capture images of flower 204 from a different angle. Thus, in this example, registered mono image is cropped in Crop 1 700 operation and color image 304 is cropped in Crop 2 702 operation to match their overlapping FOVs. Accordingly, in Registration 900 operation, the combined mono image and color image 1404 are transformed into the same coordinate system using an image registration or image alignment algorithm. Accordingly a depth map, in this example, can be determined using disparity information between mono image A 1402*a* and mono image B 1402*b* and the known relative angles of capture between first mono camera 208*a*, second mono camera 208*b*. This depth map can then be used to individually register a foreground plane and a background plane of the product of Mono Registration 1502 and color image 1404. Thus, Registration 900 operation can be performed as described above with the combined mono image resulting from Mono Registration 1502 operation replacing mono image 302.

Accordingly, after Registration 900 operation, First Guided Filter 1000 operation applies a guided filter on registered color image 1404 using combined mono image and Second Guided Filter 1002 operation applies a guided filter on combined mono image where combined mono image is used as the guiding image on itself. In YUV color space, the products of First Guided Filter 1000 operation and Second Guided Filter 1002 operation are the U and V components and a Y component, respectively, and these components are combined in YUV Fusion 1004 operation to fuse the color or chrominance of the UV channels with the luminance or brightness of the Y channel, as discussed above. Accordingly, once the UV and Y channels are combined to form a YUV image, the image can be converted from YUV color space to RGB color space in YUV to RGB 1006 operation. Accordingly, a second color correction operation, Second Color Correction 1008 operation is performed to generate fused image 1806.

Figure 16:
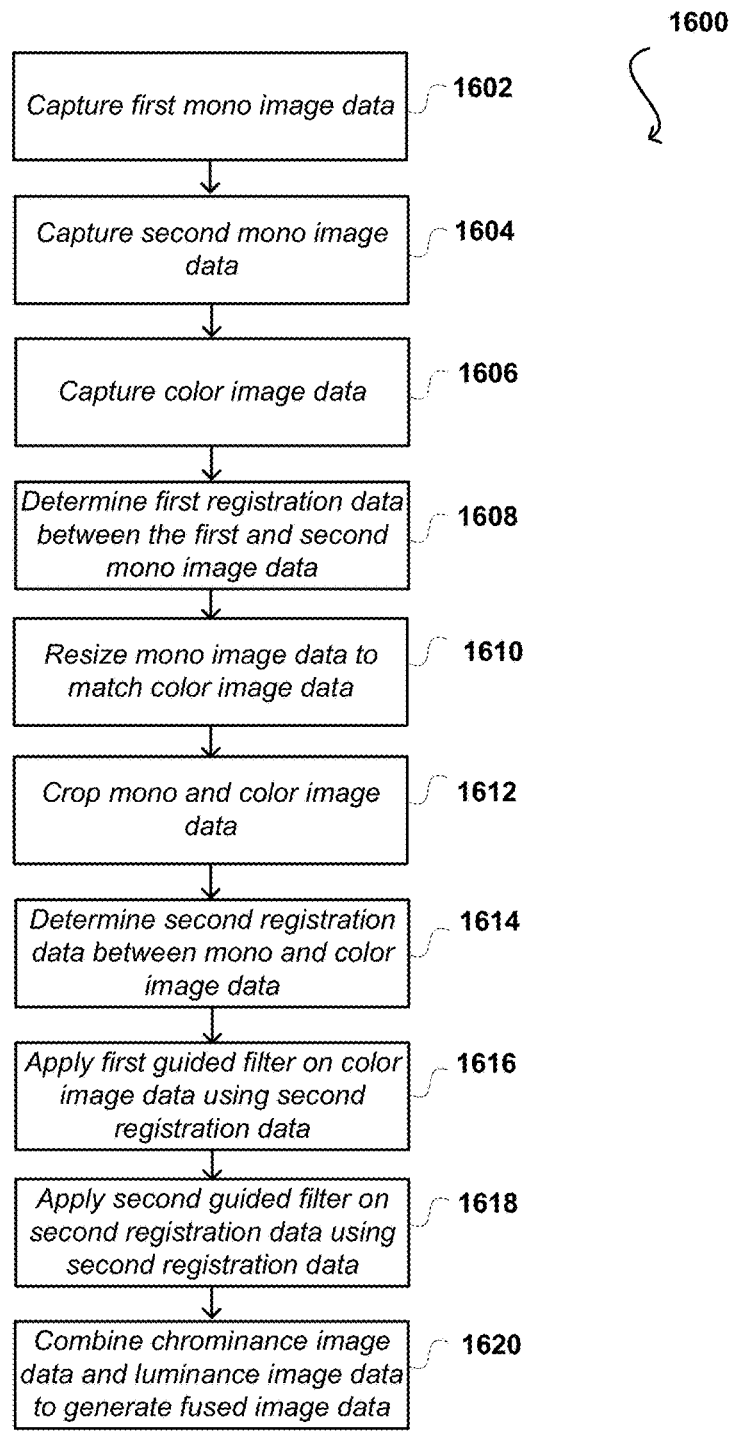
FIG. 16 illustrates an example process for combining two monochromatic images with a single color image in accordance with at least one embodiment.

FIG. 16 illustrates an example process for combining two monochromatic images with a single color image in accordance with at least one embodiment. In this example, first monochromatic image data is captured using a first monochromatic camera 1602 and second monochromatic image data is captured using a second monochromatic camera 1604. Additionally, color image data is captured using a color camera of the computing device 1606. Accordingly, the first monochromatic image data, the second monochromatic image data, and the color data are captured at substantially the same time and capturing a slightly different field of view as a result of their horizontal separation relative to each other on the back of the computing device.

Accordingly, first registration data between the first monochromatic image data and the second monochromatic image data is determined 1608. In this example, the first registration data is resized from a first image resolution to match a second image resolution of the color image data 1610. Further, since the first registration data and the color image data are captured from slightly different angles, they capture a slightly different field of view. Thus, in this example at least one of the color image data or the first registration data is cropped to a common field of view 1612. Once cropped to the common field of view, second registration data between the color image data or the first registration data is determined 1614. Accordingly, a first guided filter is applied on to the color image data using the first registration data as a first guide, smoothing the colors of the color image data, to generate chrominance image data 1616. Since the guided filter has good edge and image structure-preserving properties and can be used beyond smoothing, a second guided filter is applied to the second registration data using the second registration image data as a second guide to generate luminance image data 1618. The chrominance image data and the luminance image data are then combined 1620 to generate fused image data.

Figure 17:
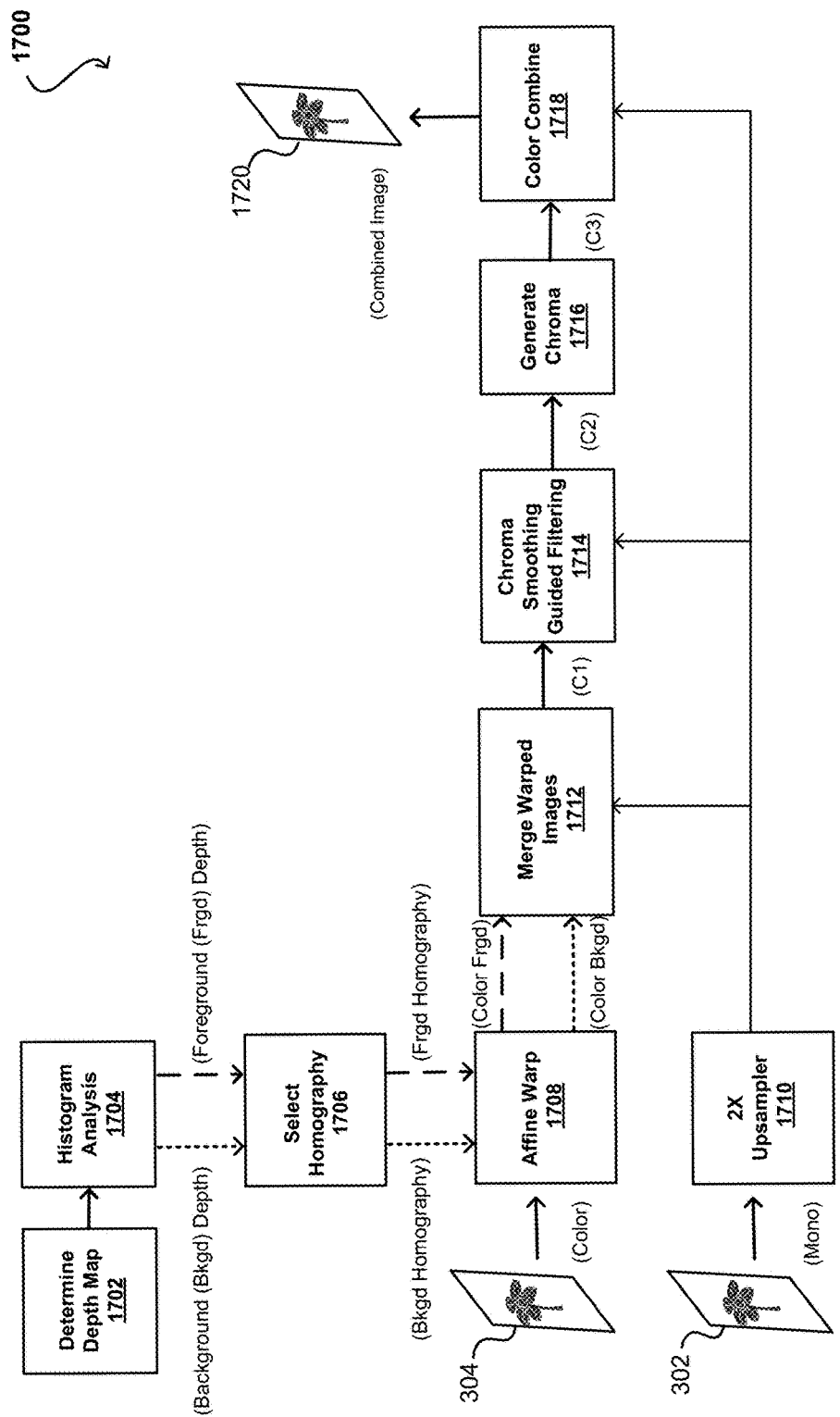
FIG. 17 illustrates an example registration operation overview in accordance with at least one embodiment.

FIG. 17 illustrates an example Image Registration Process 1700 in accordance with at least one embodiment. For example, Image Registration Process 1700 could be more practical for smaller devices with less available computing resources relative to low lighting image processing pipeline overview 1500. Accordingly, in this example, a depth map is determined in Determine Depth Map 1702 operation using disparity (306*a*, 306*b* from FIG. 3) between mono image 302 and color image 304 (or between mono image A 1402*a* and mono image B 1402*b* from FIG. 14) and the known relative angles of capture between mono camera 208 and RGB camera 210 (or between mono camera 208*a* and mono camera 208*b*). For example, the depth map can be determined on a pixel-by-pixel basis where a pixel from color image 304 is compared to a corresponding pixel from mono image 302. Based on an amount of disparity between corresponding pixels caused by the relative camera separation, a pixel is determined to be either a foreground pixel (i.e., part of a depth of focus or foreground plane) if the amount of disparity is relatively large or a background pixel (i.e., part of a background plane) if the amount of disparity is relatively small. Histogram analysis 1704 of the depth map (i.e., disparity information of each pixel) is performed to determine the depth values of the background plane and the foreground plane. Thus, the depth map, in one example, contains a depth value corresponding to either a background depth or a foreground depth for each pixel.

Using the determined values for the background plane and the foreground plane, a homography is selected in Select Homography 1706 operation. A homography is a relation by which any two images are spatially related. For example, two image of an object captured sequentially by the same camera contain the same object, background, etc., but if the object or camera was moving between images, there will be a translational or rotational difference in the representation of the object in each image. Thus, the object in the first image is spatially related to the object in the second image and this spatial relationship can be modeled mathematically as a matrix (e.g., 3×3 matrix). In this example, a homograph between images of mono camera 208 and RGB camera 210 (or between RGB camera 210 and registration data of mono camera 208*a* and mono camera 208*b*) is determined for a background plane and a foreground plane of color image 304 (or color image 1804 if using the two mono cameras 208*a*, 208*b*) to rectify the displacement between the different viewpoints of the cameras. In this example, the homography is applied to color image data, of color image 304, to adjust the viewpoint of color image 304 to match the viewpoint of mono image 302. Accordingly, the homographies can be determined by first capturing images of a target object with the cameras (i.e., mono camera 208 and RGB camera 210 or RGB camera 210 and using registration data from mono camera 208*a* and mono camera 208*b*) at a number of distances (e.g., at every 25 mm from a distance of 50 cm to 2.0 m). Second, for each of these distances (corresponding to a depth value), matching points between images (i.e., images captured by mono camera 208 and RGB camera 210 or RGB camera 210 and the registration of images captured by mono camera 208*a* and mono camera 208*b*) are identified. A feature matching algorithm, such as Random Sample Consensus (RANSAC), is then used to estimate the respective homography (e.g., rotation, translation, etc.) between these matching points of the foreground and background planes. Accordingly, the depth values and their corresponding homographies are then stored in a lookup table and a homography is, thus, selected in Select Homography 1706 operation when presented with a depth value. After the homographies are applied to the foreground and background planes, a warp is applied to each plane in Affine Warp 1708 operation to generate a two color images, a first color image warped to the background homography (Color Bkgd) and a second color image warped to the foreground (Color Frgd). An affine transformation, map, or warp is a function between spaces that preserves points, straight lines and planes. Thus, an affine warp is applied to each homography in Affine Warp 1708 to preserve image detail of color image 304.

Figure 18:
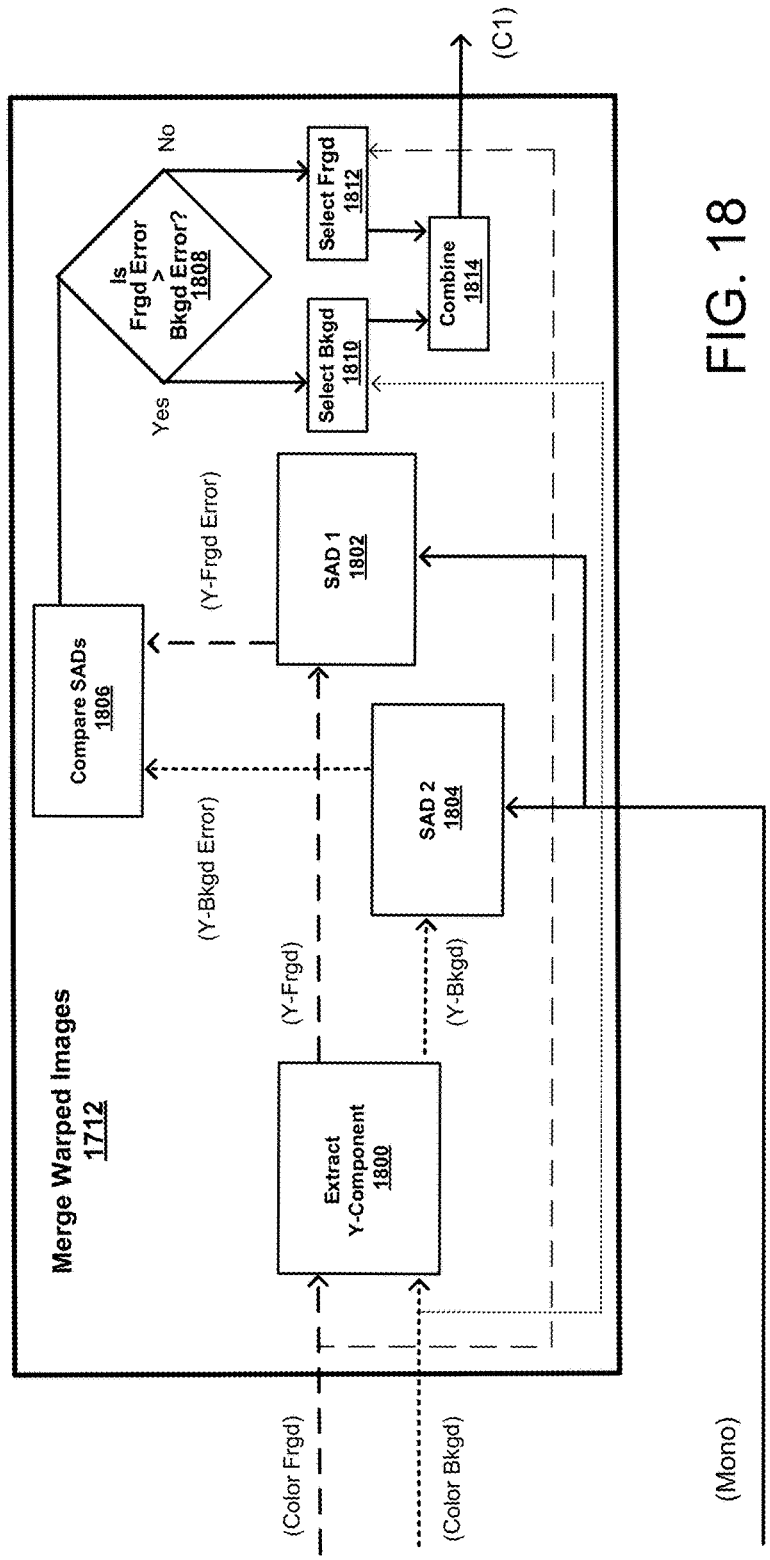
FIG. 18 illustrates an example process for merging a monochromatic image to a color image that can be utilized in accordance with various embodiments.

After a warp is applied to each homography (e.g., Bkgd and Frgd planes) to generate Color Bkgd image and Color Frgd image, mono image 302 (or registered mono between mono image A 1402a and mono image B 1402b) is upsampled in 2× Upsampler 1710 operation to increase the size or resolution of the mono image to match color image 304, as described above with respect to FIGS. 6A and 6B. The upsampled mono image is then used to create combined color image C1 from two color images (i.e., Color Bkgd image and Color Frgd image) in Merged Warp Images 1712 operation, which is discussed with reference to FIG. 18. FIG. 18 illustrates Merged Warped Images 1712 operation wherein the Y component of the YUV color space (i.e., grayscale brightness) is first extracted from Color Bkgd image and Color Frgd image in Extract Y-Component 1800 operation. In this example, the Y components of the Color Frgd image (Y-Frgd) and Color Bkgd image (Y-Bkgd) are compared to mono image 302 to determine each of their Sum of Absolute Differences (SAD) relative to mono image 302 in SAD 1 1802 and SAD 2 1804. Accordingly, the result of SAD 1 1802 and SAD 2 1804 is Y-background error (Y-Bkgd Error) and a foreground error (Y-Frgd Error) and these errors are compared to each other on a pixel by pixel basis in Compare SADs operation 1806. Accordingly, for each pixel of combined color image C1, if the Y-Frgd Error is greater than the Y-Bkgd Error in decision block 1808, the pixel from the Color Bkgd image is selected 1810 to generate or build combined color image C1 in Combine operation 1814. If, however, the Y-Frgd Error is not greater than the Y-Bkgd Error in decision block 1808, the pixel from the Color-Frgd image is selected 1812 for combined color image C1 in Combine operation 1814. Thus, combined color image C1 is generated one pixel at a time by selecting, for each pixel, the pixel (between Color Frgd image and Color Bkgd image) having the least error when compared to mono image 302. Alternatively, if performing this step without RGB to YUV Conversion operation 900, as mentioned above, the G (green) component of the RGB space would be substituted for the Y-component.

Figure 19:
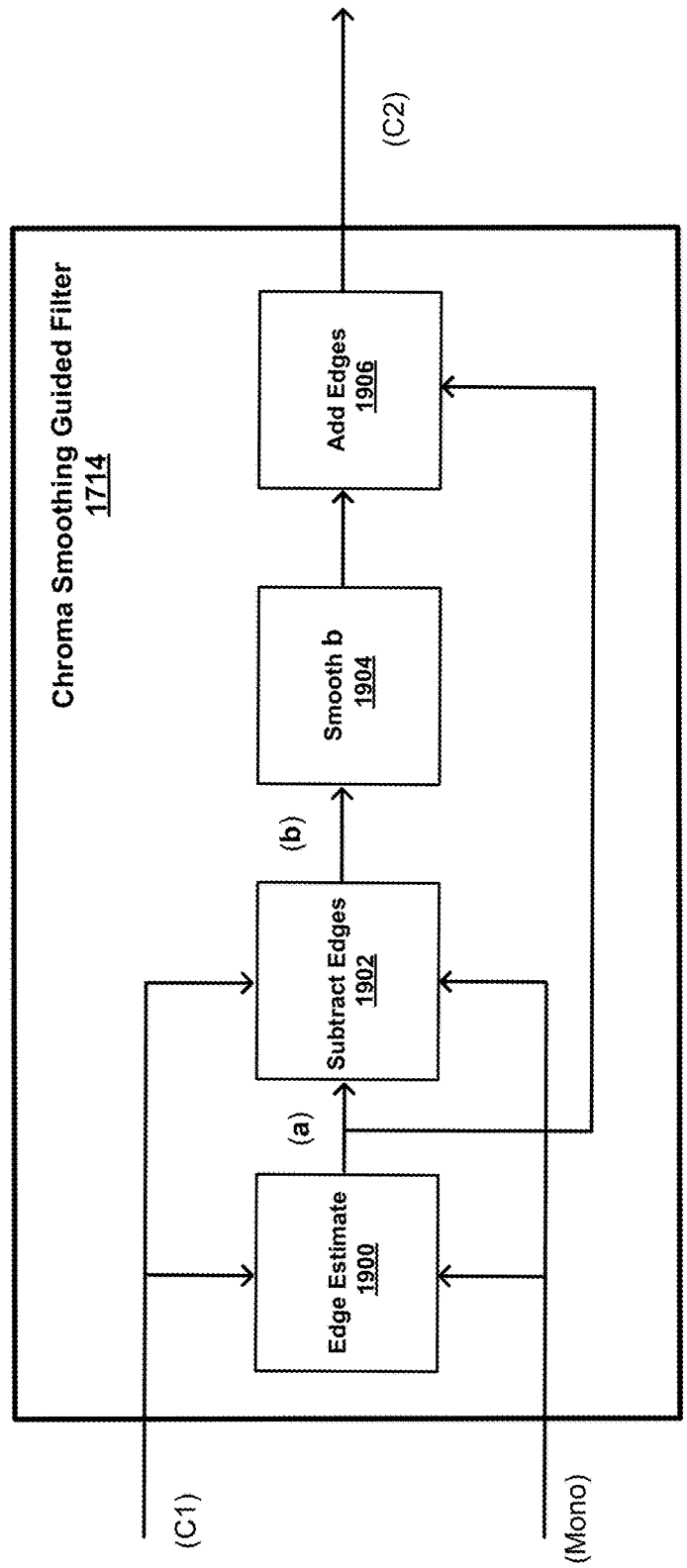
FIG. 19 illustrates an example chroma smoothing operation of the registration operation in accordance with at least one embodiment.

Referring back to FIG. 17, the result C1 of Combined 1814 operation is passed to Chroma Smoothing Guided Filtering (CSG Filtering) 1714 operation. FIG. 19 illustrates an example process wherein the colors of the product C1 are smoothed in CSG Filtering 1714 operation in accordance with at least one embodiment. In this example, a guided filtering process is performed on each color individually (i.e., either the U and V if in YUV space or the R, G, and B if in RGB space). The guided filter was developed as an alternative to bilateral filter and defined as an edge-preserving filter where the filtering output is a local linear model between the guidance image and a filter output. Accordingly, the guided filter attempts to capture patterns in the data, while leaving out noise or other fine-scale structures. In smoothing, the data points of the input signal are modified so individual points are reduced likely because of noise, and points that are lower than the adjacent points are increased leading to a smoother signal.

Thus, in CSG Filtering 1714 operation, C1 first undergoes an edge estimation process wherein only the edges of upsampled mono image 302 are preserved (not the edges of C1) to produce image a in Edge Estimate 1900 operation. Another way of looking at this is the edge information of C1 is adjusted or refined using the edge information from Mono image 302. In this example, for a given error value (epsilon) and a window size WxW, the following is calculated for each pixel to produce image a:

Compute mean(C1);
Compute mean(Mono image 302 (mono));
Compute mean(C1*C1);
Compute mean(mono*mono);
Compute sigma(mono)=mean(mono*mono)−mean(mono)^2;
Compute sigma(C1,C1)=mean(C1*C1)−mean(C1)^2; and
Compute Image a=sigma(mono)/(sigma(C1)+epsilon).

Once the edges have been preserved, edge information for image a is stored and then subtracted from C1 to produce image b in Subtract Edges 1902 operation where the product, image b, is a color image without edges. Image b can be calculated as follows: Compute Image b mean(C1)−Image a*mean(mono). After subtracting the edges, a color averaging filter is applied to ensure uniform color smoothness in Smooth b 1904 operation where the product, smooth b, is a color averaged or smoothed image without edges. The averaging filter, in this example, including:

Compute mean(Image a*Image a), mean(Image b*Image b); and
Compute Smooth(Image b)=Apply an averaging filter of size h×h where h>2*W on mean(Image b).

After the averaging filter has been applied to produce smooth b, the edges are added back in Add Edges 1906 operation. In this example, an output C2 is produced from adding back the edges of image a into smoothed image b, where C2=mean(Image a)*C1+Smooth(image b). Thus, after adding back the edges in Add Edges 1906 operation, C2 is passed to Generate Chroma 1716 operation where luminance data (Y) of C2 is removed to generate C3 or chrominance (UV) data. Then C3 is combined with upsampled Mono image 302 in Color Combine 1718 operation by combining the chrominance data (UV) with the luminance data (Y) from mono image 302 to produce combined image 1720.

Figure 20:
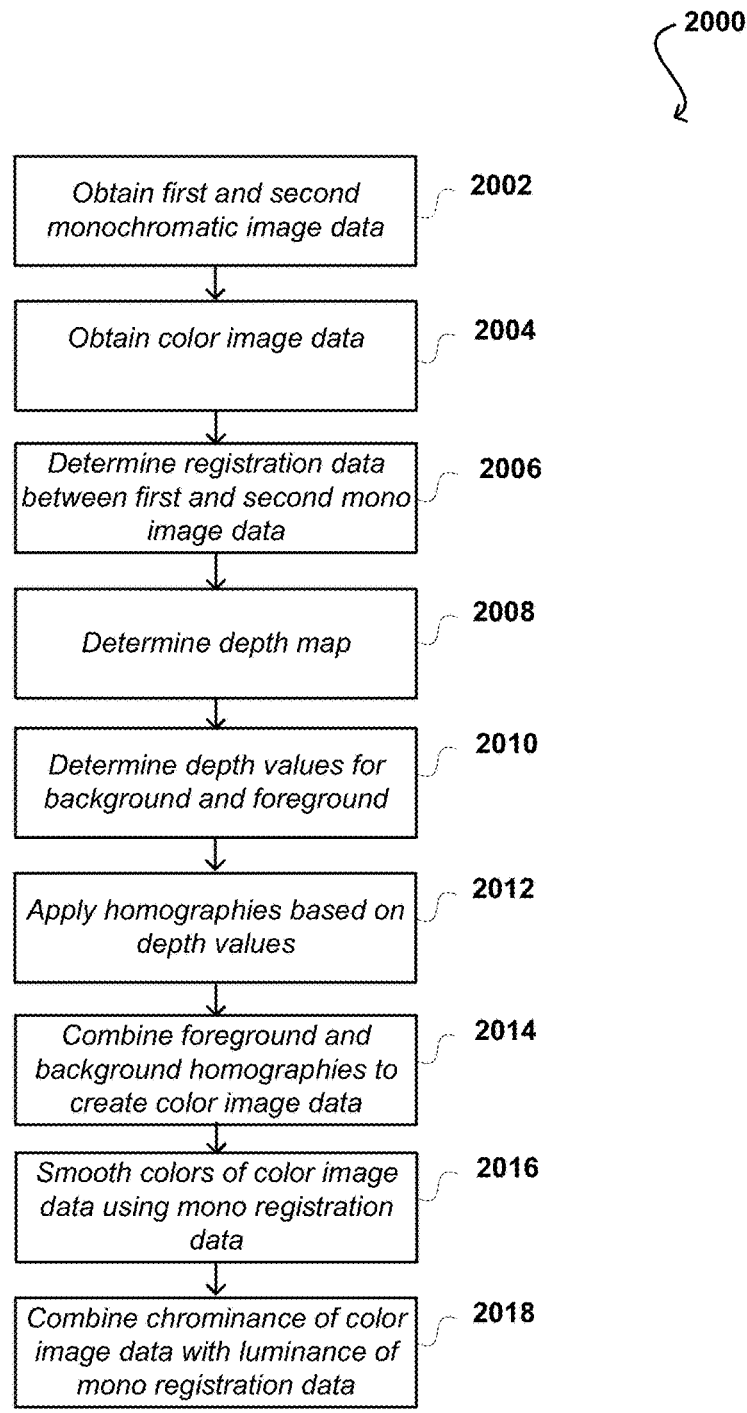
FIG. 20 illustrates an example process for registering a monochromatic image to a color image that can be utilized in accordance with various embodiments.

FIG. 20 illustrates an example process 2000 for registering a monochromatic image to a color image that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, first and second monochromatic image data is obtained 2002. The first monochromatic image data being captured by a first monochromatic camera having a first field of view and the second monochromatic image data being captured by a second monochromatic camera having a second field of view. Color image data is also obtained 2004. The color image data is captured by a color camera having a third field of view where, the third field of view at least partially overlaps the first and second fields of view of the two monochromatic cameras.

In this example, mono registration data between the first monochromatic image data and the second monochromatic image data is determined 2006. For example, one of the first monochromatic image data and the second monochromatic image data is chosen as the target image data and the other as the reference image data and the registration relates the target image space to the reference image space including include rotation, scaling, translation, and other affine transforms. Using the first monochromatic image data and the second monochromatic image data, a depth map is determined 2008. For example, the depth map can be determined on a pixel-by-pixel basis where a pixel associated with the color image data is compared to a corresponding pixel from the mono registration data. Based on an amount of disparity between corresponding pixels, a pixel is assigned to either a foreground pixel if the amount of disparity is relatively large or a background pixel if the amount of disparity is relatively small. Accordingly, histogram analysis of the depth map is performed to determine the depth values of the background plane and the foreground plane. Thus, in this example, a first depth value for a foreground plane and a second depth value for a background plane of the color image data are determined 2010 using the depth map.

Based on the depth values, a homography for the foreground and a homography for the background are separately applied to the color image data to generate two sets of the color image data 1312. For example, based on the first depth value, a first homography is applied to the color image data to generate foreground adjusted color image data and, based on the second depth value, a second homography is applied to the color image data to generate background adjusted color image data. In this example, the homographies are selected from a lookup table of predetermined homography values empirically determined for a number of depth values.

Accordingly, errors between the mono registration data and the foreground and background homographies are separately determined and the homographies are combined 2014 on a pixel by pixel basis by choosing the pixel between the foreground and background homography having the least error when compared to the mono registration data. In this example, the color texture of the combined image data is smoothed 2016 using a guided filter where the mono registration data is used as a guide to refine the color of the combined image data. Subsequently, luminance data (Y) is removed from the combined color image data to generate chrominance (UV) data. Accordingly, the chrominance (UV) data is combined with the luminance data (Y) from mono registration data to combine colors and generate a fused image from two monochromatic images and a color image captured in low light 2018.

Figures 21A, 21B:
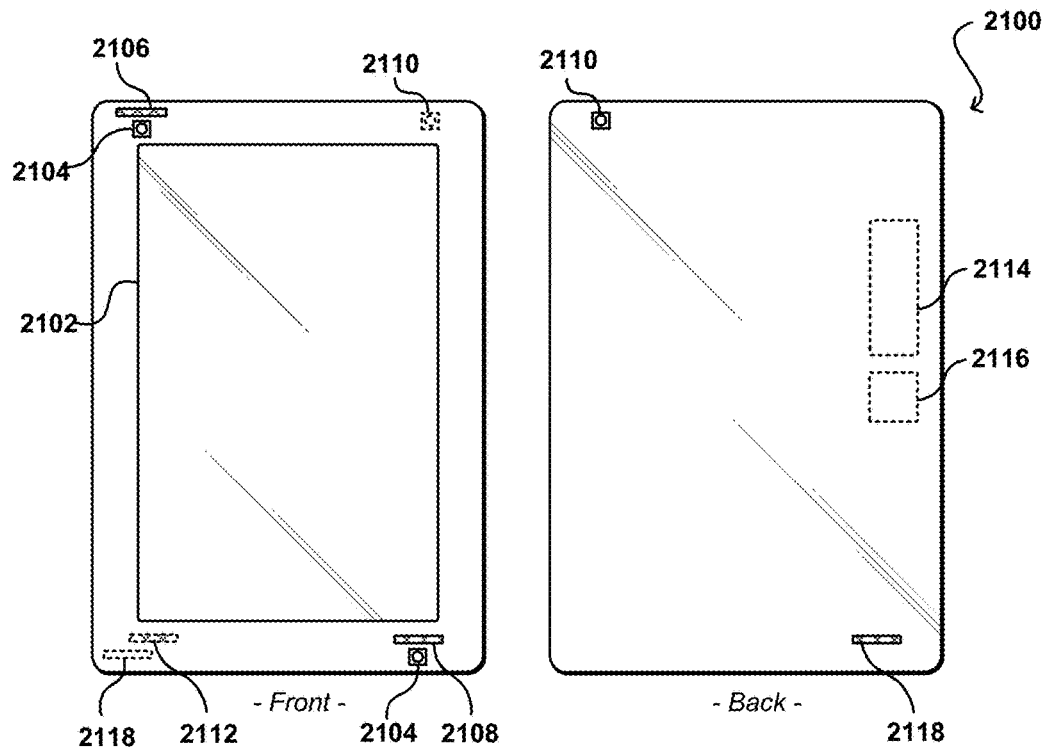
FIGS. 21A and 21B illustrate an example computing device that can be used to implement aspects of various embodiments.

FIGS. 21A and 21B illustrate front and back views, respectively, of an example electronic computing device 2100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 2100 has a display screen 2102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 2104 on the front of the device and at least one image capture element 2110 on the back of the device. It should be understood, however, that image capture elements could also, or alternatively, be placed on the sides or corners of the device, and that there can be any appropriate number of capture elements of similar or different types. Each image capture element 2104 and 2110 may be, for example, a camera, a charge-coupled element (CCD), a motion detection sensor or an infrared sensor, or other image capturing technology.

As discussed, the device can use the images (e.g., still or video) captured from the imaging elements 2104 and 2110 to generate a three-dimensional simulation of the surrounding environment (e.g., a virtual reality of the surrounding environment for display on the display element of the device). Further, the device can utilize outputs from at least one of the image capture elements 2104 and 2110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 2108 on the front side, one microphone 2112 on the back, and one microphone 2106 on or near a top or side of the device. In some devices there may be only one microphone, while in other devices there might be at least one microphone on each side and/or corner of the device, or in other appropriate locations.

The device 2100 in this example also includes one or more orientation- or position-determining elements 2118 operable to provide information such as a position, direction, motion, or orientation of the device. These elements can include, for example, accelerometers, inertial sensors, electronic gyroscopes, and electronic compasses.

The example device also includes at least one communication mechanism 2114, such as may include at least one wired or wireless component operable to communicate with one or more electronic or computing devices. The device also includes a power system 2116, such as may include a battery operable to be recharged through conventional plug-in approaches, or through other approaches such as capacitive charging through proximity with a power mat or other such element. Various other elements and/or combinations are possible as well within the scope of various embodiments.

Figure 22:
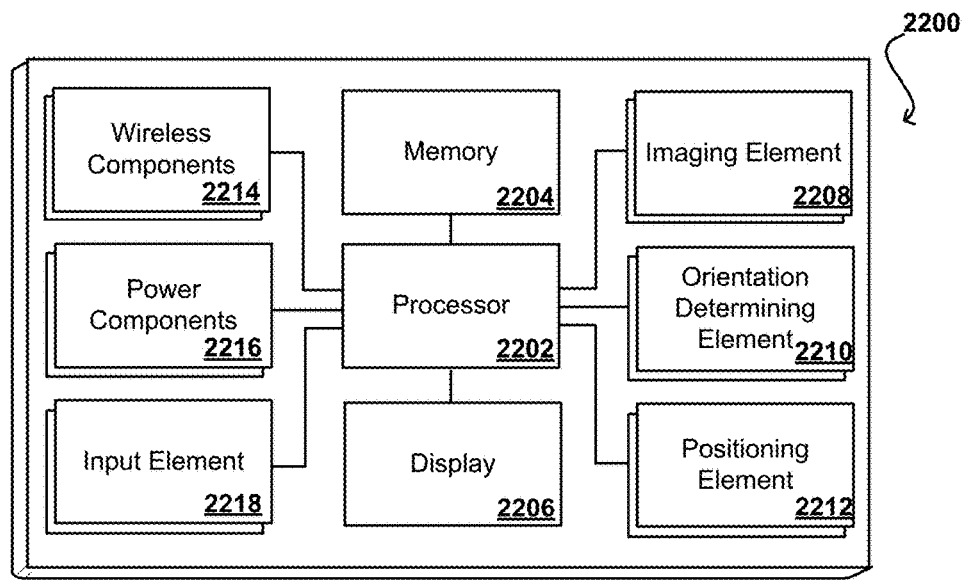
FIG. 22 illustrates example components that can be used with a device such as that illustrated in FIGS. 21A and 21B.

FIG. 22 illustrates a set of basic components of an electronic computing device 2200 such as the device 2100 described with respect to FIG. 21. In this example, the device includes at least one processing unit 2202 for executing instructions that can be stored in a memory element or element 2204. As would be apparent to one of ordinary skill in the art, the device can include many types of memory, data storage, or computer-readable media, such as a first data storage for program instructions for execution by the processing unit(s) 2202, the same or separate storage can be used for images or data, a removable memory can be available for sharing information with other devices, and any number of communication approaches can be available for sharing with other devices.

The device typically will include some type of display element 2206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 2208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 2200 also includes at least one orientation determining element 2210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 2200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 2212 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 2214 operable to communicate with one or more electronic or computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 2216, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input element 2218 able to receive conventional input from a user. This conventional input can include, for example, a push button, touch pad, touch screen, wheel, joystick, keyboard, mouse, keypad, or any other such component or element whereby a user can input a command to the device. These I/O elements could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 23:
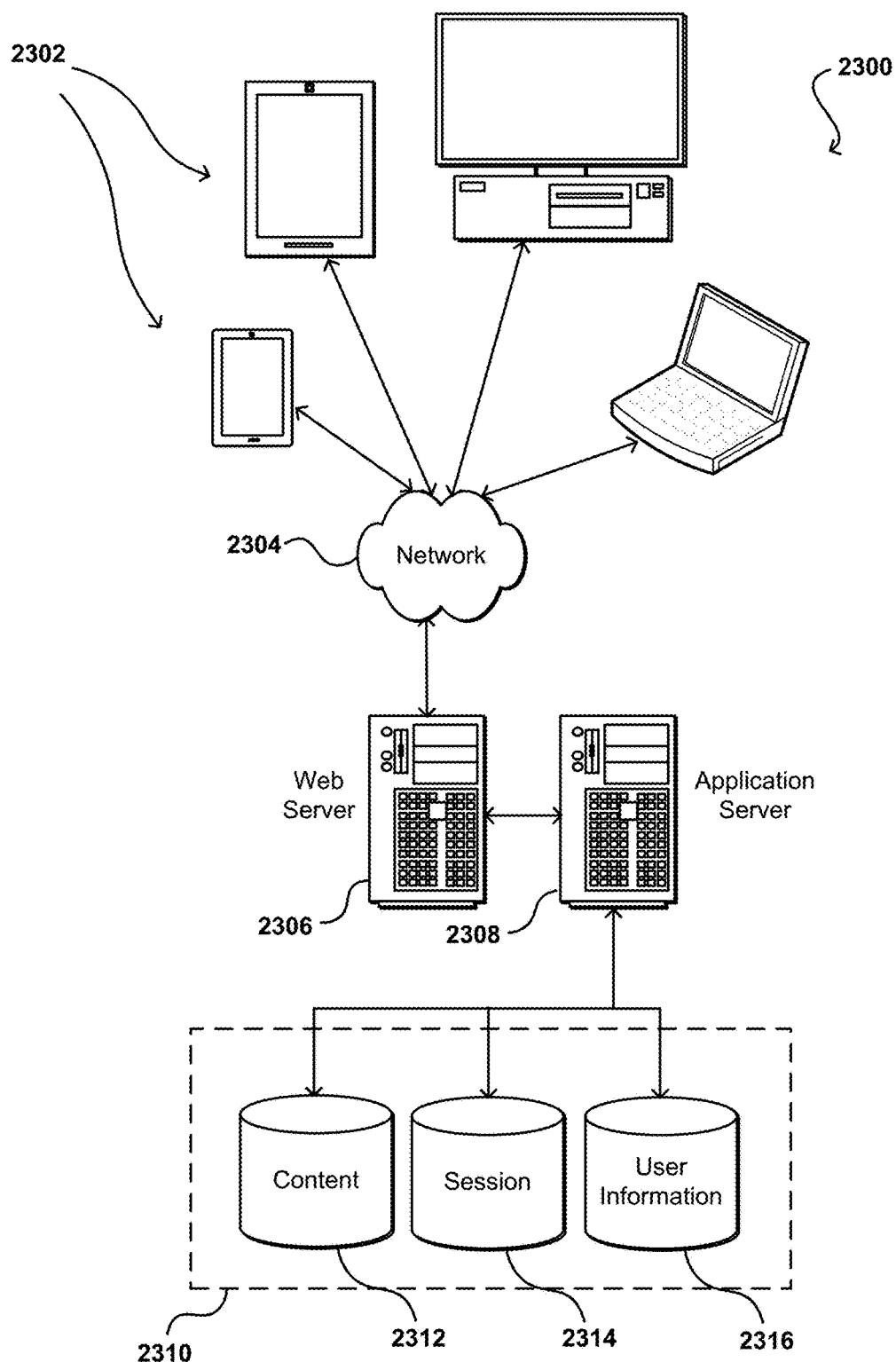
FIG. 23 illustrates an environment in which various embodiments can be implemented.

As discussed, different approaches can be implemented in various environments in accordance with the described embodiments. For example, FIG. 23 illustrates an example of an environment 2300 for implementing aspects in accordance with various embodiments. As will be appreciated, although a Web-based environment is used for purposes of explanation, different environments may be used, as appropriate, to implement various embodiments. The system includes an electronic client device 2302, which can include any appropriate device operable to send and receive requests, messages or information over an appropriate network 2304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 2306 for receiving requests and serving content in response thereto, although for other networks, an alternative device serving a similar purpose could be used, as would be apparent to one of ordinary skill in the art.

The illustrative environment includes at least one application server 2308 and a data store 2310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 2308 can include any appropriate hardware and software for integrating with the data store 2310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 2306 in the form of HTML, XML or another appropriate structured language in this example. The handling of all requests and responses, as well as the delivery of content between the client device 2302 and the application server 2308, can be handled by the Web server 2306. It should be understood that the Web and application servers are not required and are merely example components, as structured code discussed herein can be executed on any appropriate device or host machine as discussed elsewhere herein.

The data store 2310 can include several separate data tables, databases or other data storage mechanisms and media for storing data relating to a particular aspect. For example, the data store illustrated includes mechanisms for storing content (e.g., production data) 2312 and user information 2316, which can be used to serve content for the production side. The data store is also shown to include a mechanism for storing log or session data 2314. It should be understood that there can be many other aspects that may need to be stored in the data store, such as page image information and access rights information, which can be stored in any of the above listed mechanisms as appropriate or in additional mechanisms in the data store 2310. The data store 2310 is operable, through logic associated therewith, to receive instructions from the application server 2308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 2302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 23. Thus, the depiction of the system 2300 in FIG. 23 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for enhancing images captured in low light, the method comprising:
    capturing, using a first monochromatic camera of a computing device, first monochromatic image data, the first monochromatic image data corresponding to a first monochromatic image, the first monochromatic camera having a first field of view;
    capturing, using a second monochromatic camera of the computing device, second monochromatic image data, the second monochromatic image data corresponding to a second monochromatic image, the second monochromatic camera having a second field of view and the second field of view at least partially overlapping the first field of view;
    capturing, using a color camera of the computing device, color image data, the color image data corresponding to a color image, the color camera having a third field of view and the third field of view at least partially overlapping the first field of view and the second field of view, and the first monochromatic image, the second monochromatic image and the color image each overlap in a common field of view;
    determining that an average luminance level of the color image data is below a threshold luminescence level;
    determining first registration data between the first monochromatic image data and the second monochromatic image data;
    upsampling the first registration data from a first size to match a second size of the color image data;
    removing a portion of at least one of the color image data or the first registration data corresponding to pixels located outside of the common field of view;
    determining second registration data between the first registration data and the color image data for the common field of view;
    removing first luminance data from the color image data to generate chrominance data;
    refining color information associated with the chrominance data using texture data from the second registration data;
    refining the second registration data using the second registration data as a second guide to generate second luminance data;
    combining the chrominance image data from the color image data with the second luminance data from the second registration data of the first monochromatic image data and the second monochromatic image data to generate fused image data; and
    displaying an image corresponding to the fused image data on a display screen of the computing device.

2. The computer-implemented method of claim 1, wherein refining the color information is performed using a first guided filter that smoothens the color information and transfers at least one of edge data or structure data from the second registration data to the chrominance data.

3. The computer-implemented method of claim 1, wherein refining the second registration data is performed using a second guided filter that averages out noise and preserves edge data of the second registration data to generate the luminance data.

4. The computer-implemented method of claim 1, wherein the chrominance data corresponds to U and V components of a YUV color space and the second luminance data corresponds to a Y component of the YUV color space, and wherein to generate the fused image data, the Y component from the first monochromatic image data and the second monochromatic image data is combined with the U and V components from the chrominance data.

5. A method comprising:
    obtaining, by a computing device, first image data using a color image sensor;
    obtaining, by the computing device, second image data using a monochromatic image sensor;
    determining, by the computing device, registration data between the first image data and the second image data;
    applying, by the computing device, a first guided filter on the first image data using the registration data as a guide to generate chrominance image data;
    applying, by the computing device, a second guided filter on the second image data to generate luminance image data;

combining, by the computing device, the chrominance image data and the luminance image data to generate fused image data; and displaying, by the computing device, the fused image data on a display screen.

6. The method of claim 5, further comprising:

adjusting, from a first image resolution, a size of the first image data to correspond to a second image resolution of the second image data.

7. The method of claim 5, wherein a first field of view corresponding to the first image data and a second field of view corresponding to the second image data at least partially overlap in a common field of view.

8. The method of claim 7, further comprising:

removing a portion of at least one of the first image data or the second image data corresponding to pixels located outside of the common field of view.

9. The method of claim 5, further comprising:

determining an average luminescence value for the second image data, and wherein determining the registration data further comprises determining the registration data between the first image data and the second image data when the average luminescence value is below a threshold value.

10. The method of claim 5, wherein the chrominance image data corresponds to U and V components of a YUV color space and the luminance image data corresponds to a Y component of the YUV color space, and wherein combining the chrominance image data and the luminance data further comprises combining the Y component from the first image data with the U and V components from the second image data to generate the fused image data.

11. The method of claim 10, wherein the first guided filter removes the Y component from the first image.

12. The method of claim 5, wherein the first guided filter smoothens texture associated with the first image data and preserves image structure data from the registration data to the first image data to generate the chrominance image data.

13. The method of claim 5, further comprising:

adjusting colors of the first image data to match a brightness level of the registration data.

14. A computing device, comprising:

a processor;
a first monochromatic camera;
a second monochromatic camera;
a color camera;
a display screen; and
memory including instructions that, when executed by the processor, cause the computing device to:
capture first mono image data using the first monochromatic camera;
capture second mono image data using the second monochromatic camera;
capture color image data using a color camera;
determine first registration data between the first mono image data and the second mono image data;
determine second registration data between the first registration data and the color image data;
remove first luminance data from the color image data to generate chrominance data;
apply a first guided filter to the chrominance data using the second registration data as a guide to generate chrominance image data;
apply an averaging filter to the second registration data to generate second luminance image data;
combine the chrominance image data and the second luminance image data to generate fused image data; and
display an image corresponding to the fused image data on the display screen.

15. The computing device of claim 14, wherein the instructions, when executed by the processor, further enable the computing device to:

apply, using the first mono image data and the second mono image data, a super-resolution algorithm to the first registration data.

16. The computing device of claim 14, wherein the instructions, when executed by the processor, further enable the computing device to:

adjust, from a first image resolution, a size of the first registration data to correspond to a second image resolution of the color image data.

17. The computing device of claim 14, wherein determining the mono registration data includes:

remove a portion of at least one of the first registration data or the color image data to crop at least one of a first field of view corresponding to the first registration data or a second field of view corresponding to the color image data to a common field of view.

18. The computing device of claim 14, wherein the chrominance image data corresponds to U and V components of a YUV color space and the luminance image data corresponds to a Y component of the YUV color space, and wherein to generate the fused image data, the Y component from the first mono image data and the second mono image data is combined with the U and V components from the color image data.

19. The computing device of claim 14, wherein the averaging filter is a guided filter that averages out noise and preserves edge data of the second registration data to generate the second luminance image data.

20. The computing device of claim 14, wherein the instructions, when executed by the processor, further enable the computing device to:

determine an average luminescence value for the color image data, the second registration data between the first registration data and the color image data being determined in response to the average luminescence value being below a threshold value.

* * * * *